(12) United States Patent
Larab et al.

(10) Patent No.: US 7,752,607 B2
(45) Date of Patent: Jul. 6, 2010

(54) SYSTEM AND METHOD FOR TESTING BUSINESS PROCESS CONFIGURATIONS

(75) Inventors: Bassam A. Larab, San Jose, CA (US); Vaughn Paladin, San Jose, CA (US)

(73) Assignee: SAP AG, Walldorf (DE)

( * ) Notice: Subject to any disclaimer, the term of this patent is extended or adjusted under 35 U.S.C. 154(b) by 568 days.

(21) Appl. No.: 11/251,281

(22) Filed: Oct. 13, 2005

(65) Prior Publication Data
US 2007/0088668 A1   Apr. 19, 2007

(51) Int. Cl.
*G06F 9/44* (2006.01)
(52) U.S. Cl. ...................................... 717/135
(58) Field of Classification Search ......... 717/101–102, 717/104, 117, 115, 125, 110, 135; 719/313; 714/38, 43; 702/186; 715/700
See application file for complete search history.

(56) References Cited

U.S. PATENT DOCUMENTS

| | | | |
|---|---|---|---|
| 6,257,774 B1 * | 7/2001 | Stack | 717/110 |
| 6,601,233 B1 * | 7/2003 | Underwood | 717/102 |
| 6,810,494 B2 | 10/2004 | Weinberg et al. | |
| 6,907,546 B1 * | 6/2005 | Haswell et al. | 714/38 |
| 2002/0083213 A1 * | 6/2002 | Oberstein et al. | 709/313 |
| 2005/0149868 A1 * | 7/2005 | Katayama et al. | 715/700 |

OTHER PUBLICATIONS

International Search Report & Written Opinion mailed May 15, 2008 for International Application No. PCT/US06/40390.

* cited by examiner

*Primary Examiner*—Tuan Anh Vu
(74) *Attorney, Agent, or Firm*—Blakely, Sokoloff, Taylor & Zafman, LLP

(57) ABSTRACT

Systems and methods are provided for automated testing of business process application configurations. A test library contains test elements, which are building blocks that codify all possible interactions with business processes in business process application configuration. The elements interact with the business process application's user interface. A business process test can be defined in a test development environment by adding data input elements to the test to test specific business processes. The flow of execution in a business process test can be defined by adding control elements to the test. The control elements interact with the application's user interface submit or cancel business process operations. The business process test can be executed as a test script to perform automated testing. The tests can continue to function properly when the application or its user interface changes, because the elements are independent of most details of the user interface.

27 Claims, 15 Drawing Sheets

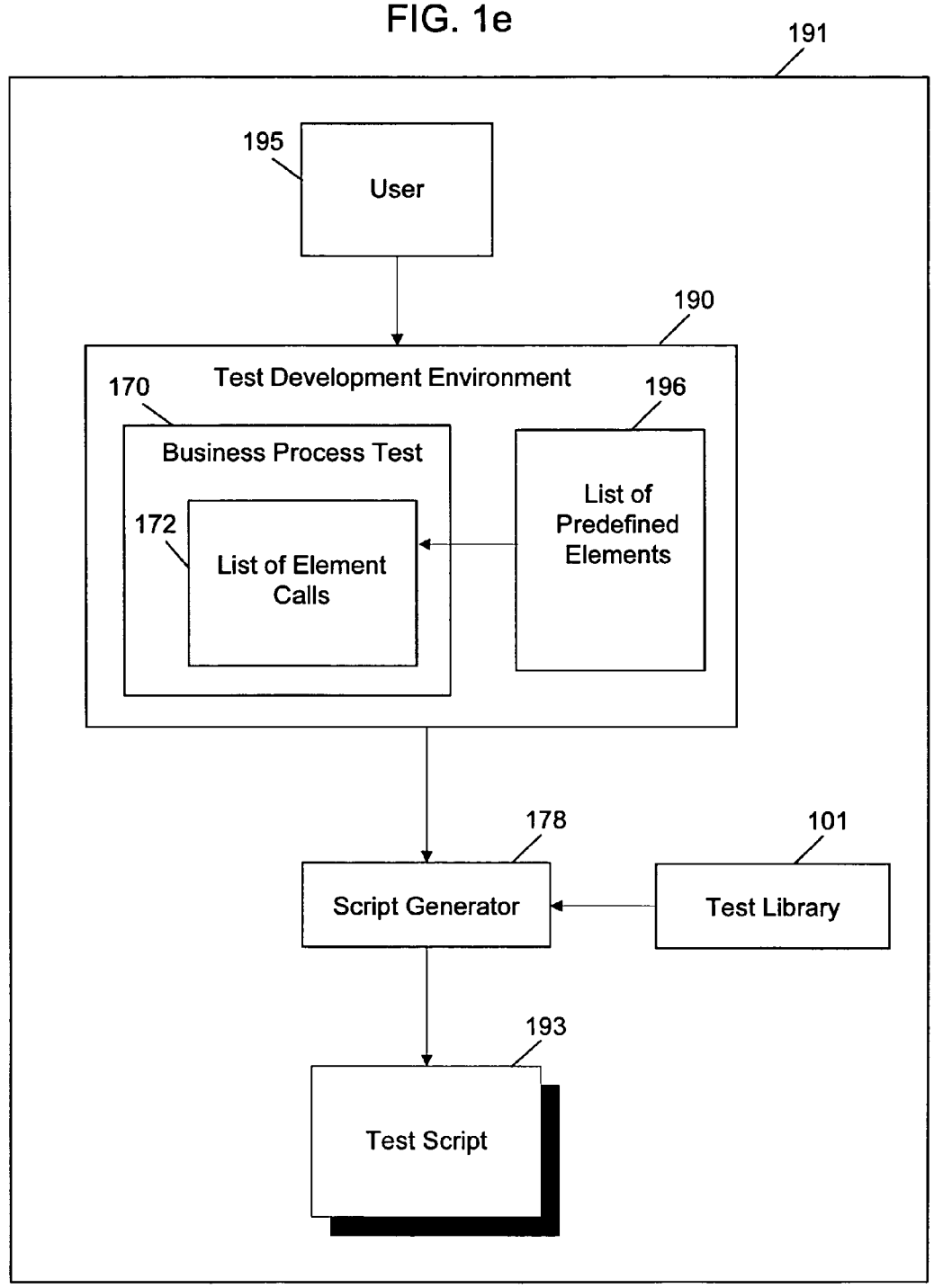

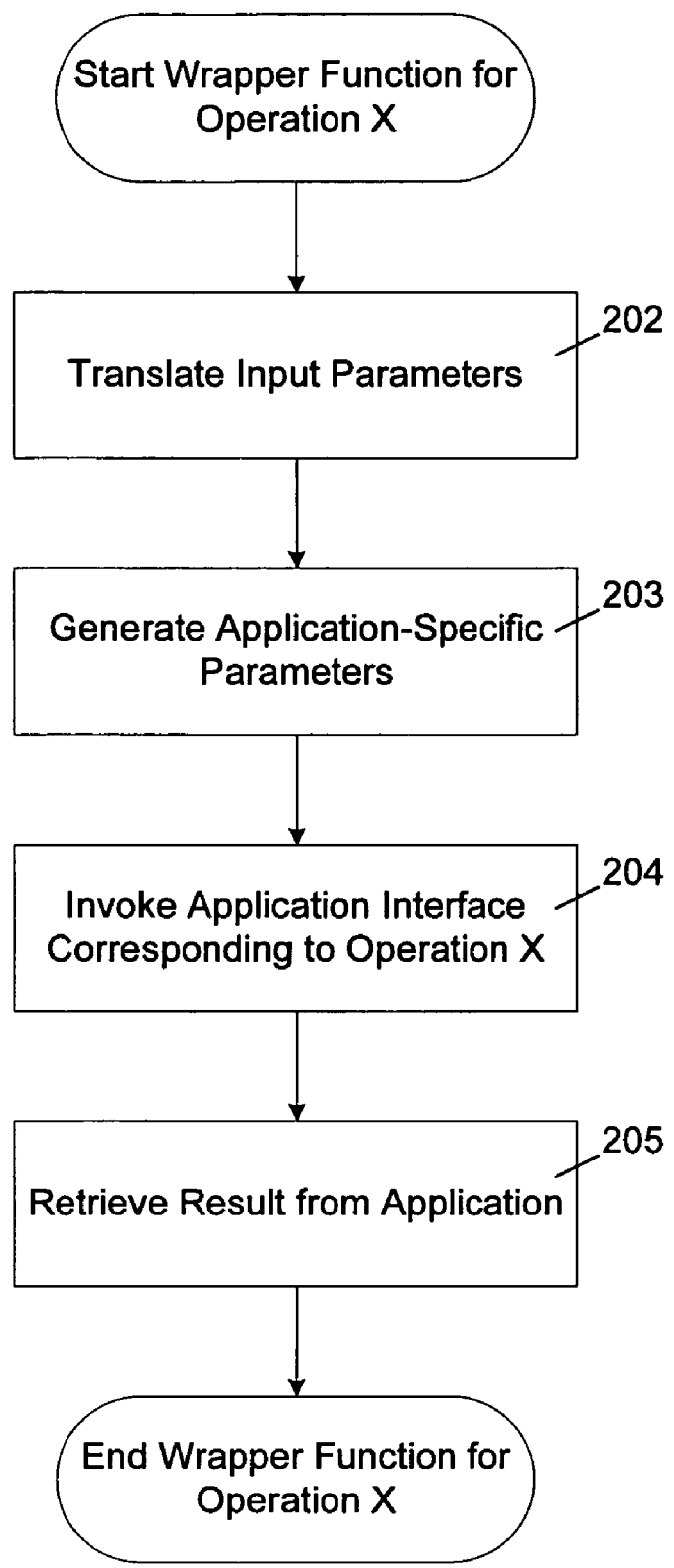

SYSTEM AND METHOD FOR TESTING BUSINESS PROCESS CONFIGURATIONS

APPENDIX

The specification includes Appendixes A and B, which form part of the disclosure. Appendix A includes an example application wrapper function in source code form, and Appendix B lists elements for interacting with a business process application.

BACKGROUND OF THE INVENTION

The invention relates generally to testing of software, and more specifically to systems and methods for automated testing of software that executes business processes.

Business process application software allows for the definition and execution of business processes in a computer system. Examples of business processes include updating customer information, receiving and fulfilling orders, synchronizing customer information stored on multiple computer systems, and generating a price quote. Business processes are often associated with data descriptions and transformation rules for accessing individual data items, such as a customer name or a unit price. A business process specifies a sequence of activities to be performed in a specified order, and may specify conditional and repeated execution of activities. Business process application software can execute a business process, prompting for or retrieving input data as needed, and produce results or effects, such as output data or execution of database transactions. A business process application configuration includes a set of business processes and associated data, including data descriptions and transformation descriptions, which specify how to execute one or more particular business processes using general-purpose business process application software, such as SAP or Siebel. The configuration information is typically represented as data stored in disk files or in an online repository, depending on the particular business process application software. The business process software can load the configuration information, including the business process, and subsequently execute the business processes. For example, a shipping company may have a business process application configuration consisting of a computer system running SAP software with a ShipmentReceived business process, which is to be executed when a shipping container arrives at a transit hub. The ShipmentReceived business process updates an inventory database of shipping container locations and invokes another computer system to route the shipping container to its destination. The shipping company may have a second business process application configuration consisting of another computer system running Siebel software with a ConfirmOrder business process, which is to be executed when an order has been processed. The ConfirmOrder business process, which is invoked by an order processing system, retrieves the customer's e-mail address from Siebel and sends an e-mail notice to the customer describing the order.

It is desirable to be able to automatically test the execution of a business process application configuration by a business process application for correctness. Testing a software program involves interacting with the program in a test environment and verifying that the program operates correctly, based on the program's behavior in response to input supplied during the interaction. The interaction may be manual testing performed by a human or automated testing performed by a test program. Automated testing is desirable because human effort is not necessary to perform the testing. However, substantial time and effort may still be required to create the test program that will perform the automated testing. Software programs called test automation systems have been developed to reduce the time and effort necessary to create test programs. Existing test automation systems can generate automated tests, but the tests generated are dependent on many details of the application, including many design-time user interface details that are generally not relevant to the correct functioning of business process configurations. For example, the position of a text input box on a screen does not affect the correctness of execution of a business process. The position of a text input box may be important at design time, when the business process is created and configured, but is not important at run time, when the business process is actually executed. Existing test automation systems broadly capture information about behavior of the application that is not relevant to the correct execution of a business process, and generate automated tests that rely on this unnecessary information. The drawback of this broad capturing of information is that any changes to the business process application configuration, such as changes to details of user interface objects, are likely to cause the test to fail, because the test automation system requires the captured information to closely match the actual behavior of the application when a test is run. Examples of changes that are likely to cause tests to fail include changes to application user interface objects such as text boxes, menus, screen layouts, or replacement of one object by another type of object.

It would be desirable to be able to generate test programs that continue to operate correctly when unrelated features of the software being tested change.

SUMMARY OF THE INVENTION

In general, in a first aspect, the invention features a business process test library for interacting with a business process application. The business process test library includes data input elements, control elements, and complex elements. The data input elements transfer input data to every business process in a predefined set of business processes. The control elements perform a business process completion operation for every business process in the predefined set. The complex elements invoke the data input elements and the control elements to test every business process in the predefined set. Embodiments of the invention may include one or more of the following features. The predefined set of business processes may include all business processes in a business process application configuration.

In general, in a second aspect, the invention features a business process test library stored in a computer-readable medium. The business process test library includes application wrapper function logic for interacting with a business process application, data input element logic, and control element logic. The application wrapper function logic has a control portion and a data input portion. The data input element logic invokes the data input portion to provide input data for a business process of the business process application. The control element logic invokes the control portion to perform a business process completion operation.

Embodiments of the invention may include one or more of the following features. The data input portion of the application wrapper function logic may provide text input to the application. The control portion of the application wrapper function logic may generate events in a user interface associated with the application. The business process completion operation may invoke the control portion to generate an Enter key press, or an OK button press event, or a Cancel button press event in a user interface associated with the application.

The business process test library may also include complex element logic. The complex element logic may invoke defined portions of the data input element logic, and may also invoke defined portions of the control element logic. The complex element logic may include a complex element for performing every business process in a predefined set of business processes. Defined portions of the data input element logic, the control element logic, and the complex element logic may be combined to invoke any business process provided by the application. A defined first portion of the complex element logic may invoke a defined second portion of the complex element logic.

The business process test library may also include business process test logic. The business process test logic may invoke defined portions of the complex element logic. The business process test logic may include an invocation list. The invocation list may have at least one call to a defined portion of control or complex element logic, and may be associated with an actual parameter list. The actual parameter list may be passed to the defined portion of control or complex element logic, respectively, during execution of the call by a test script. The business process test logic may invoke defined portions of the data input element logic, and may invoke defined portions of the control element logic.

The data input element logic may include an invocation list that has at least one function call for invoking a defined portion of the data input portion or the control portion of the application wrapper function logic. The data input element logic may include input elements which can provide input data for every business process in a predefined set of business processes. The control element logic may include control elements which can perform business process completion operations for every business process in the predefined set.

In general, in a third aspect, the invention features a business process test environment, which includes a business process test development environment, a business process test library for invoking a business process application, and a script generator. The business process test development environment can create a business process test from a list of predefined elements. The script generator can generate a test script based on the business process test. The test script can invoke the test library to perform the business process test.

In general, in a fourth aspect, the invention features a method of creating a business process test library. The method includes the steps of adding application wrapper functions to the test library to interact with an application user interface, adding data input elements to the test library, where the data input elements provide input data for business processes; and adding control elements to the test library, where the control elements invoke the application wrapper functions to perform business process completion operations.

Embodiments of the invention may include one or more of the following features. The method of creating a business process test library may also include the step of, for each business process in a business process application configuration, adding an associated complex element to the test library for providing input data to the business process. The application wrapper functions may generate events in a user interface associated with the application. The business process completion operation may include invoking the wrapper functions to generate an Enter key press event, or an OK button press event, or a Cancel button press event in a user interface associated with the application. The data input elements may provide input data for every business process in a predefined set of business processes. The data input elements may provide input data for every business process in a predefined set of business processes, and the control elements may perform business completion operations for every business process in the predefined set of business processes. The method of creating a business process test library may also include the steps of adding a business process test to the test library; adding one or more complex element calls to the business process test for invoking an associated complex element to test a business process, adding input data to the business process test for the business process, wherein the input data is associated with the complex element calls, and adding at least one control element call to the business process test for invoking an associated control element to complete a defined portion of the business process.

In general, in a fifth aspect, the invention features a method of defining a business process test. The method of defining a business process test includes the steps of adding one or more data input element calls to the business process test, and adding one or more control element calls to the business process test after adding the data input element call(s), where the control element call(s) will be executed after the data input element call(s). Embodiments of the invention may include one or more of the following features. The method of defining a business process test may also include the step of adding input data for the business process to the business process test, wherein the input data is associated with the data input element call(s). The method of defining a business process test may also include the steps of selecting at least one data input element for the data input element call(s) from a list of data input elements, and selecting at least one control element for the control element call(s) from a list of control elements.

BRIEF DESCRIPTION OF THE DRAWINGS

FIG. 1e is an illustrative drawing of a business process test environment according to one embodiment of the invention

FIG. 2 is an illustrative drawing of a flowchart of the abstract steps performed by application wrapper functions according to one embodiment of the invention.

FIGS. 5a-5c are illustrative drawings of application screens filled in with data according to one embodiment of the invention.

DETAILED DESCRIPTION OF THE INVENTION

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1A:
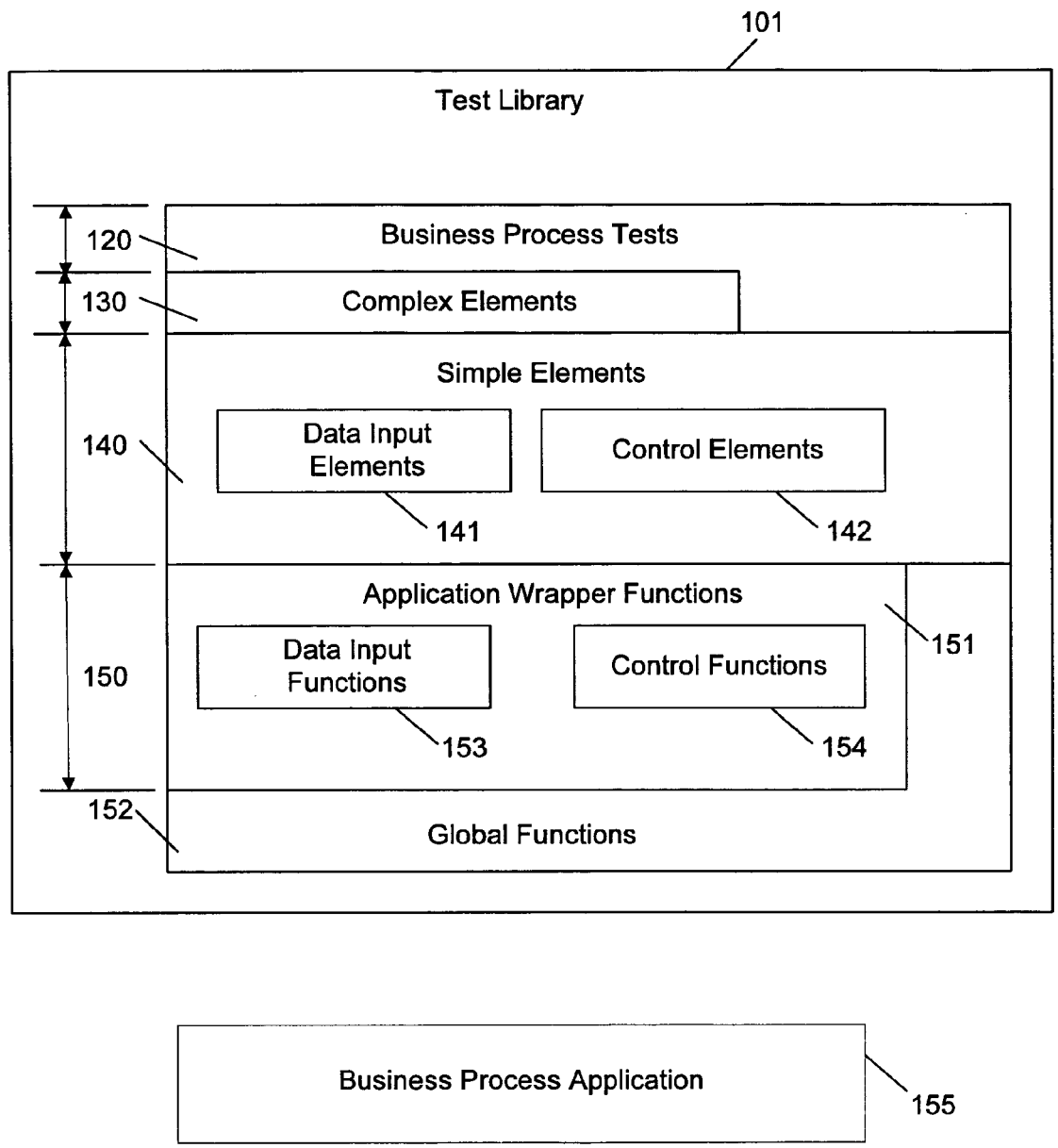
FIG. 1a is an illustrative drawing of a test library according to one embodiment of the invention.

FIG. 1a is an illustrative drawing of a test library according to one embodiment of the invention. The test library 101 includes business process tests 120, which include instructions for testing a business process application 155. The business process tests 120 invoke complex elements 130 and simple elements 140. The complex elements 130 can invoke the simple elements 140 and other complex elements 130. The simple elements 140 include data input elements 141 and control elements 142. The simple elements 140 invoke functions of a function layer 150, including application wrapper functions 151 and global functions 152. The test library 101 can be stored on a computer-readable medium. A computer-readable medium is any type of computer memory, such as floppy disks, hard disks, CD-ROM, Flash ROM, nonvolatile ROM, and RAM.

All possible interactions with a business process provided by the application 155 can be tested by providing a complex element in the set of complex elements 130 that interacts with every business process provided by the application 155. In general, any business process provided by the application 155 can be tested by performing every type of interaction that the application 155 provides to a user for the business process. Every type of interaction that the application 155 provides for a business process can be performed by an element, typically a complex element 130, which interacts with the application's user interface to perform the interaction type. Therefore, a business process can be tested by providing an element to perform the interaction type, and by allowing a user to define a business process test 120 that invokes the complex elements 130 for a particular business process with specific input data and with control actions for choosing particular paths of execution when choices are available, e.g. when there is an option to submit or cancel a portion, e.g. an input screen, of a business process. A user can therefore test a business process thoroughly by defining at least one business process test with specific input data for each path of execution, and using control elements to direct the application 155 to take each possible path of execution, with complex elements 130 to provide input data for each path. Therefore all possible interactions with a defined set of business processes can be tested by defining a business process test that calls complex elements 130. The complex elements 130 provide input to the application by calling data input elements 141, and control the flow of application execution by calling control elements 142.

The business process tests 120, complex elements 130, simple elements 140, and functions 150 forms multiple levels of abstraction, which allow for reuse of the elements and functions in multiple test scenarios. The application wrapper functions 151 are computer program code in a language such as Visual Basic™, VBScript™, or the like, which invokes the business process application 155 to perform specific tasks such as entering data in an input field on a screen. The application wrapper functions 151 provides a simple, uniform interface for invoking the application 155, by wrapping the application-specific interface with an application-independent interface that can be called by the simple elements 140. The data input elements 141 enter values into the application 155, and the control elements 142 control the application by, for example, submitting previously-entered values to the application, such as by generating an Enter key press event, clicking an OK button, or clicking a Cancel button. The Enter key press event, clicking of an OK button, and clicking of a Cancel button complete a business process, and are therefore referred to as business process completion operations herein. The application wrapper functions 151 allow the business process tests 120 to perform automated testing of the user interface of application 155 while allowing many details of the application 151, such as user interface objects and their properties, to change without affecting the correct functioning of the business process tests 120. In particular, changes to user interface objects such as text boxes, menus, screen layouts, or replacement of one object by another type of object will not break the business process test 120 as long as the wrapper functions are still able to interact with those objects. For example, a Set_Text wrapper function is used to set values in text boxes. The Set_Text wrapper function refers t a text box using a name, so that tests based on the wrapper function will continue to function correctly as long as a the text with that name remains present in the user interface. Changes to size or location properties of the text box will not affect the correct functioning of the business process test 120.

Every type of interaction with the application 155, e.g. every type of business process provided by SAP, Siebel, or the like, can be codified as a complex element 130. Each complex element 130 supplies data values to the application 155, but does not perform a final step of completing or submitting the interaction. That is, the complex element 130 provides data, but does not control the actions of the application 155. For example, many interactions are business processes that include several data-entry steps and end with a final step in which a user performs a business process completion operation by pressing an Enter key or clicks an OK or Cancel button to complete the interaction or business process. The complex element 130 performs the data entry set by providing data values to the application 155, but does not perform the final step of pressing the Enter key or clicking the OK or Cancel button. Instead, the final step is supplied in a business process test 120 that invokes the element. A user creates a specific business process test 120 to test a specific function or business process of the application 155 by adding data input elements and control elements to the business process test 120. These elements are stored in a list in a specific order, so that when the business process test 120 is executed, the elements will be executed in that order. A user can add a control element after a data input element to perform the final step of pressing the Enter key or Clicking the OK or cancel button to complete the business process according to the requirements of the specific test. A user is therefore able to define the control flow by adding a control element at the appropriate location in the list of elements. Each business process test 120 is thereby able to control the flow of processing in the application 155, by invoking a control element 142 that either submits the current screen with information provided by a previously-invoked complex element 130 and proceeds to the next screen, or cancels the current screen and returns to a previous screen. An example of a control element 142 that submits the current screen and causes the application to continue to a subsequent screen is a Press_Enter element, which generates a key press event that presses the Enter key, or a Press_Button element with an "OK" argument, which presses an OK button in a user interface. An example of a control element 142 that cancels the current screen and causes the application to return to a previous screen is the Press_Button element with a "Cancel" argument, which presses a Cancel button. Therefore any possible use of, i.e. interaction with, the application can be tested by creating a business process test 120 that includes a call to the complex element 130 that corresponds to the interaction, with particular input values for the interaction, and ending with control elements to complete the business process.

A list of data input elements and complex elements, which call the data input elements and wrapper functions, is shown in Appendix B. The elements listed in Appendix B codify every possible interaction, i.e., every possible business process, with the SAP business process application for two end-to-end, i.e. complete, business processes named Quote to Cash and Procure to Pay. Quote to Cash includes processes for a quoting process, a picking process, a packing process, a shipping process, an invoicing process, a check receipt process, and a check/invoice process of the SAP business process application.

The set of business processes to be tested may be restricted to a subset of all business processes that are provided by the application. For example, the SAP application provides multiple business processes In a particular configuration of a business process application, e.g. a particular user installation, only a subset of all business processes provided by SAP will typically be used, so only that subset of business processes need be tested to achieve a complete test of the business process application configuration. For example, an SAP configuration may include processes named MB02 Change Material Document, MB03 Display Material Document, and MB01 Goods Receipt for Purchase Order. A test of that SAP configuration would include a complex element in the set of complex elements 130 for interacting with each of those processes.

Figure 4A:
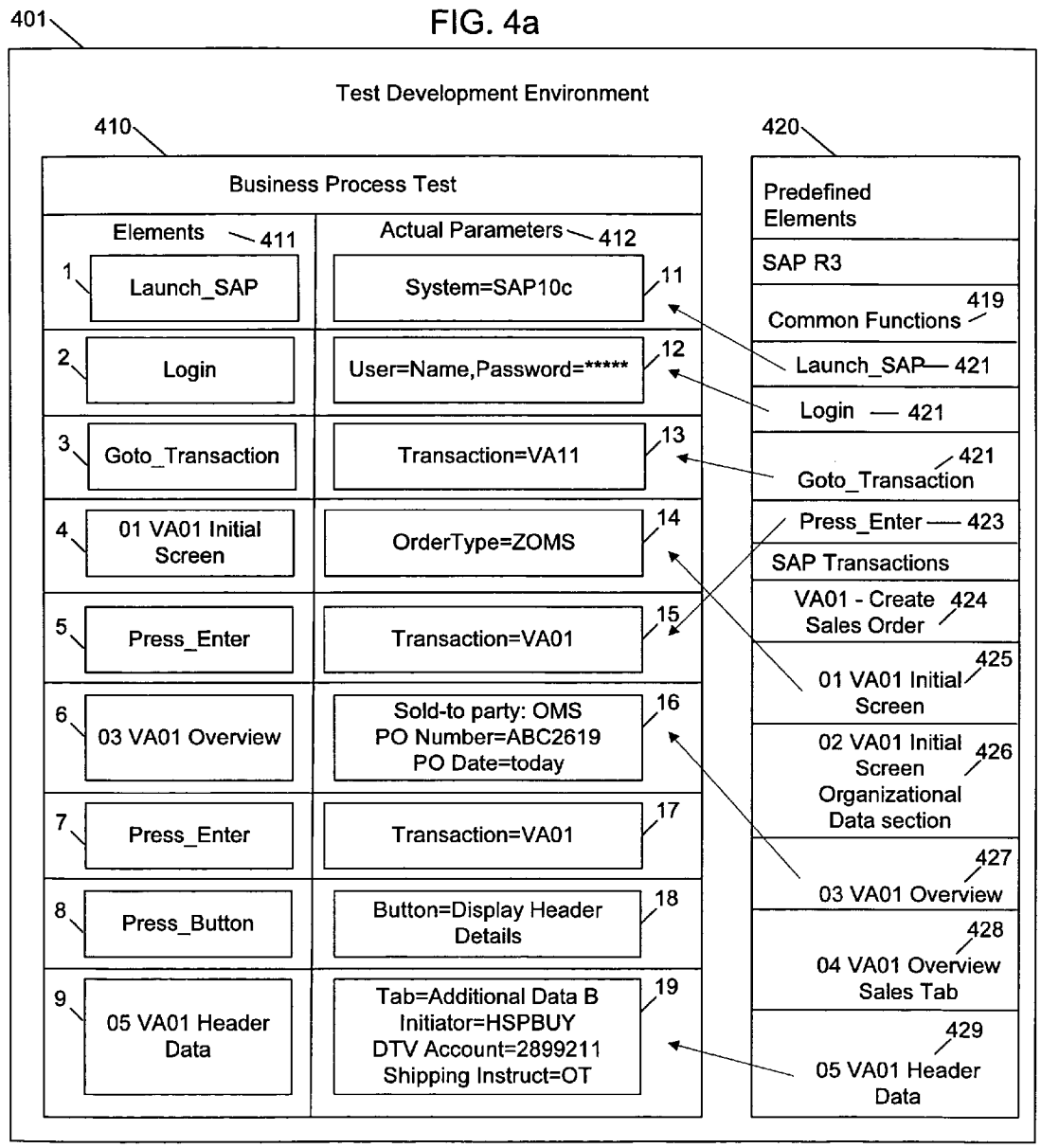
FIGS. 4a and 4b are illustrative drawings of a business process test development environment and a business process test according to one embodiment of the invention.
Figure 4B:
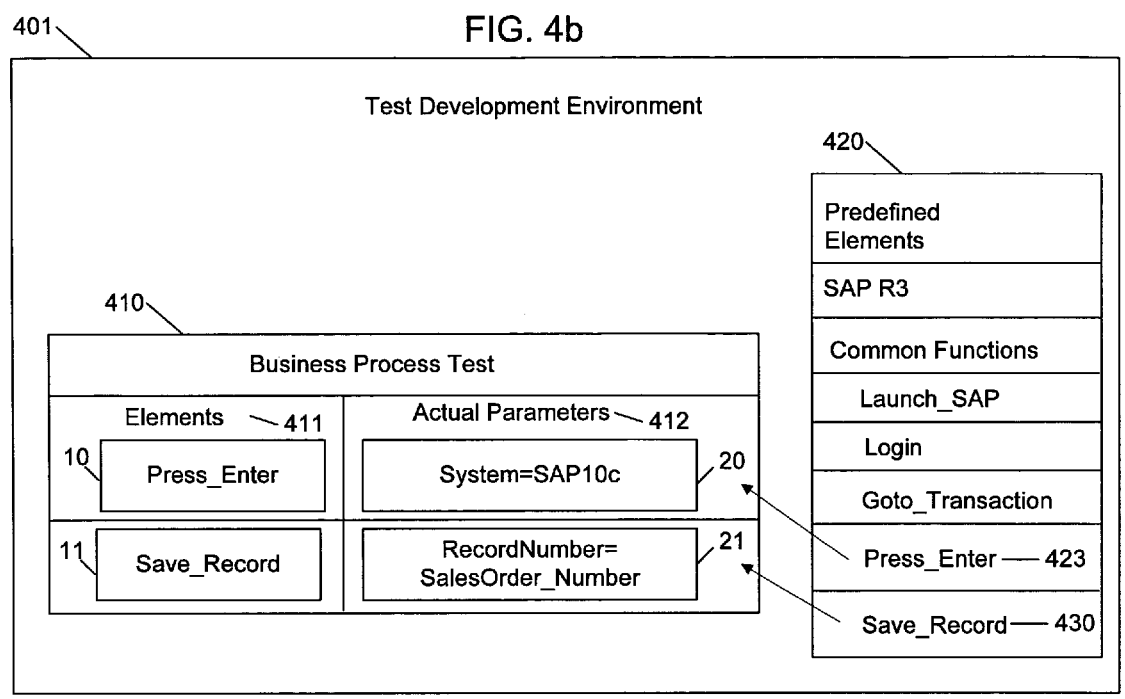

FIGS. 4a and 4b are illustrative drawings of a business process test development environment 401 and a business process test 410 according to one embodiment of the invention. The business process test development environment 401 is implemented by computer program code. A business process test that performs a typical interaction includes element calls such as a Launch SAP element call 1 and a Login element call 2. The Login and Launch SAP elements are instances of the control elements 142 of FIG. 1a. In this example, the interaction is a business process named VA01 Create Sales order, which is a business process provided by an SAP application. The remaining elements are an Initial Screen element 4 for performing an Initial Screen business process, a VA01 Overview element 6 for performing a VA01 Overview business process, and a VA01 Overview Header Data element 9 for performing an Overview Header Data business process. These elements are instances of the complex elements 130 of FIG. 1a. The complex elements 130 provide data for application business process screens and are based on the particular application, e.g. SAP, Siebel, or the like.

Since substantially every potential interaction with the application is available as an element, but the elements do not perform control flow operations (control flow operations include pressing the Enter key or clicking an OK or cancel button as described above), a business process test 120 can be created by selecting and combining complex elements 130 and simple elements 140. Once the elements have been selected and combined, a script generator (not shown in FIG. 1a) can generate a test script that can be subsequently executed to test specific actions of the application 155. There is no need for a user to write a script or record actions. Instead, the script generator generates the script based on the elements.

Figure 1B:
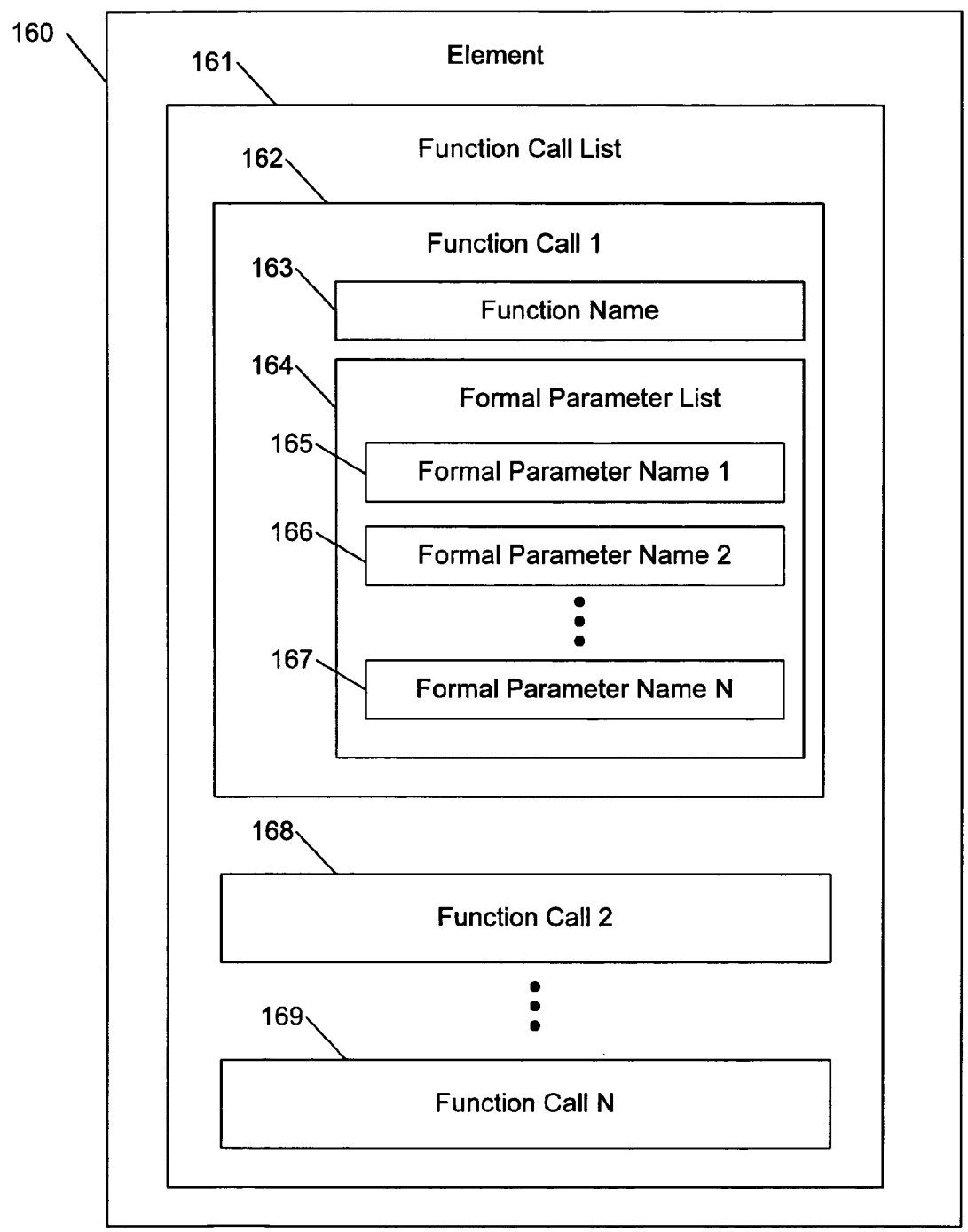
FIG. 1b is an illustrative drawing of an element of a business process test according to one embodiment of the invention.

FIG. 1b is an illustrative drawing of an element 160 of a business process test according to one embodiment of the invention. The element 160 may be, with reference to FIG. 1a, one of the simple elements 140 or one of the complex elements 130. The element 160 may be invoked by one or more business process tests 120 or by one or more complex elements 130, and may invoke any combination of or more of the simple elements 140, one or more of the complex elements 130, and one or more of the functions 150. The invocations to be made by an element 160 are specified as a function call list 161, which is an ordered list of function calls 162. Each function call 162 includes a function name 163, e.g. the name of a function or element to be invoked, and, optionally, a formal parameter list 164, which is an ordered list of parameter names, starting with a parameter name 165. Optionally, each parameter name 165 in the parameter list 164 may be associated with a data type, e.g. string or numeric, to indicate the type of value expected. According to one embodiment, the terms formal parameter and actual parameter are used to indicate parameter variables declared in an element definition and actual values passed by a business process test to an element, respectively. That is, the actual parameters are specific values supplied for formal parameters of an element. Actual parameters can be specified when a business process test is designed, e.g., as literal constants, or when a business process test is executed, e.g., as data values to be read from a spreadsheet.

The element 160 may be, for example, computer program code in programming language such as VBScript™ or the like. The element 160 may also be a computer-readable file that specifies a list of any number of functions and elements to invoke, including actual parameter values to be passed to each function or element. The file may be executable by a computer, e.g. as part of a test script, or after transformation to a test script, to invoke the specified functions and elements. The function call 163 is analogous to a function call in a general-purpose programming language, and, when executed by computer program code, transfers the program code's execution to a called function or element (not shown) identified by the function name 163. The computer program code that executes the function call is referred to as call invocation logic herein. The called function or element eventually finishes executing and returns an error status, which may indicate success or failure, at which point the next function call 168 is executed, unless the called function returned an error, in which case the element 160 stops invoking functions and returns control to its caller, along with the error status. When the last function call 169 in the list 161 has been executed, the control of execution returns to an invoking business process test or element (not shown), which invoked the element 160. Three function calls are shown in FIG. 1b as a first call 162, a second call 168, and an Nth call 169, to illustrate that the function call list 161 is an ordered list of one or more function calls. In practice, the function call list 161 may include one, or two, or any number of function calls. Similarly, three parameter names are shown to illustrate that the formal parameter list 164 is an ordered list of one or more parameters. In practice, the formal parameter list 164 may include one, two, or any number of parameters.

Data input elements supply data to user interface objects such as text boxes and checkboxes. Data input elements do not dynamically affect the flow of an application, for example a data input element named Set_Text may input data into the application, but it does not cause the application to navigate to another screen. If an application does have a text box that does affect the flow of an application, e.g. by changing to another screen, then that specific text box will become its own element. Note that Set_Text is available as both a wrapper function and an element that invokes the Set_Text wrapper function, to allow for a development environment that allows a user to create business application tests from elements, but not from wrapper functions. Other examples of data input elements include: Select_Checkbox for selecting an item from a checkbox, Select_RadioButton for selecting one of several options from a set of radio buttons, and Select_ComboBox for selecting an element from a list in a combo box.

Control elements control the application flow to determine how an application will behave. A control element typically performs one action in the application's user interface. For example, a Press_Enter control element presses the Enter key. Other examples of control elements include Go_To_Transaction for selecting a specified business process screen, Press_Continue for pressing a continue button, Press_Button for pressing a specified button, Go_Back for returning to a previous application screen, and Select_Menu for selecting an item from a menu.

Figure 1C:
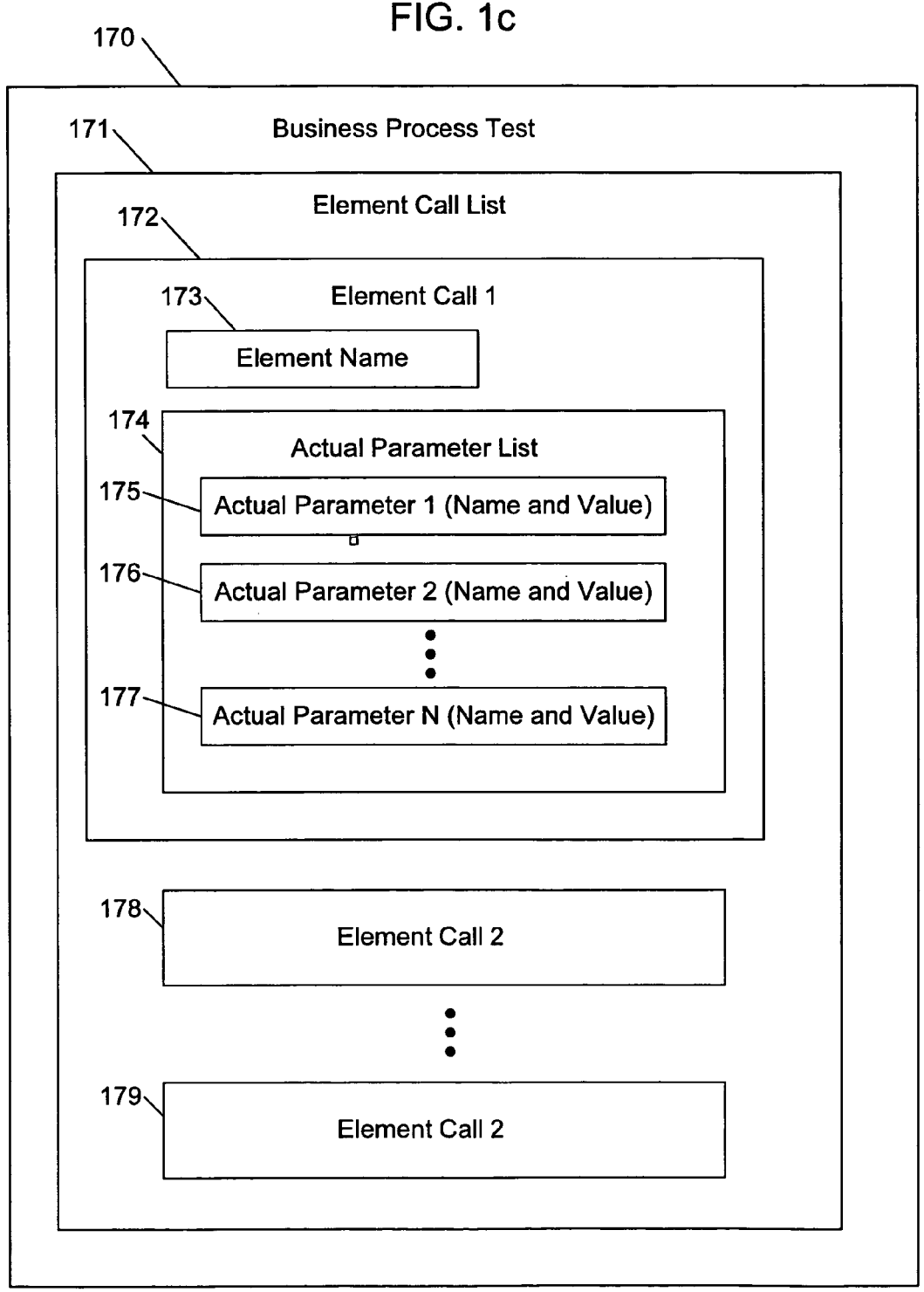
FIG. 1c is an illustrative drawing of a business process test according to one embodiment of the invention.

FIG. 1c is an illustrative drawing of a business process test 170 according to one embodiment of the invention. The business process test 170 is one of the business process tests 120 illustrated in FIG. 1a. The business process test 170 invokes one or more elements in a predetermined order. The business process test 170 is structurally similar to the element 160, since it includes a list of element calls 171, which is similar to the function call list 161 of the element 160 of FIG. 1b. However, the business process test 170 provides actual values for parameters when it invokes elements, and may invoke control elements. In contrast, the element 160 passes parameter values from its invoker to the functions and elements that it invokes, and does not usually invoke control elements. The list of element calls 171 is an ordered list and includes one or more element calls 172. The element call 172 includes an element name 173, which identifies a simple or complex element (not shown), and an optional actual parameter list 174, which specifies one or more actual parameter names and associated values 174 to be passed to the simple or complex element. The actual parameter names for an element correspond to the formal parameter names in the parameter list 164 for that element, with reference to FIG. 1b. If the formal parameters have types, then the types of the actual parameter values correspond to, directly or via type conversions, the types of the formal parameter values.

The business process test 170 is represented and executed similarly to the element 160 of FIG. 1b. The business process test 170 may be, for example, computer program code in programming language such as VBScript™ or the like. The business process test 170 may also be a computer-readable file that specifies a list of any number of functions and elements to invoke, including actual parameter values to be passed to each function or element. The file may be executable by a computer, e.g. as part of a test script, or after transformation to a test script, to invoke the specified functions and elements. As with the function call 162 of the element 160, the element call 172 is analogous to a function call in a general-purpose programming language, and, when executed by a computer, transfers control of execution to a called function or element (not shown) identified by the element name 173.

Three element calls are shown in FIG. 1b, a first call 172, a second call 178, and an Nth call 179, to illustrate that the element call list 171 is an ordered list of one or more element calls. In practice, the element call list 171 may include one, or two, or any number of element calls. Similarly, three actual parameter names are shown to illustrate that the actual parameter list 174 is an ordered list of one or more parameters. In practice, the actual parameter list 174 may include one, two, or any number of parameters.

As stated above, the business process test 170 of FIG. 1c can be executed by a test execution environment to perform testing of an application 155. Execution of a test occurs in a top-down manner, starting with a test set or a business process test 170. When a business process test 170 is invoked, each element call 171 is executed in the order in which it occurs in the business process test 170. When an element call 171 is executed, the element specified by the element name 172 is invoked with parameter values specified by the actual parameters, if any actual parameters are supplied. An actual parameter 174, a second actual parameter 175, and an Nth actual parameter 176 are shown to indicate that any number of actual parameters can be included in an element call 171. Similarly, a second element call 177 and an Nth element call 178 are shown to indicate that any number of element calls, each potentially to a different element with different actual parameters, can be included in a business process test 170.

The application wrapper functions 151 interact with an application 155, e.g. SAP, Siebel, or the like, by, for example, calling functions that interact with the application's user interface. The application wrapper functions 151 may be implemented in a programming language, e.g. VBScript or the like, as described below. The application wrapper functions 151 include data input wrapper functions 153 and control wrapper functions 154. The data input wrapper functions 153 interact directly or indirectly with the application's user interface to provide data to the application, for example, by setting a text value in a text box on a business process data input screen of an application user interface. The data input wrapper functions 153 may also receive data from the application, e.g. by extracting data from a text box. The control wrapper functions 154 interact directly or indirectly with the application's user interface to control the flow of application execution, e.g. by selecting a particular business process screen, or by submitting or canceling a business process data input screen. Application wrapper functions can also verify user interface behavior and validate the correctness of an application by comparing actual application output to expected application output.

Figure 1D:
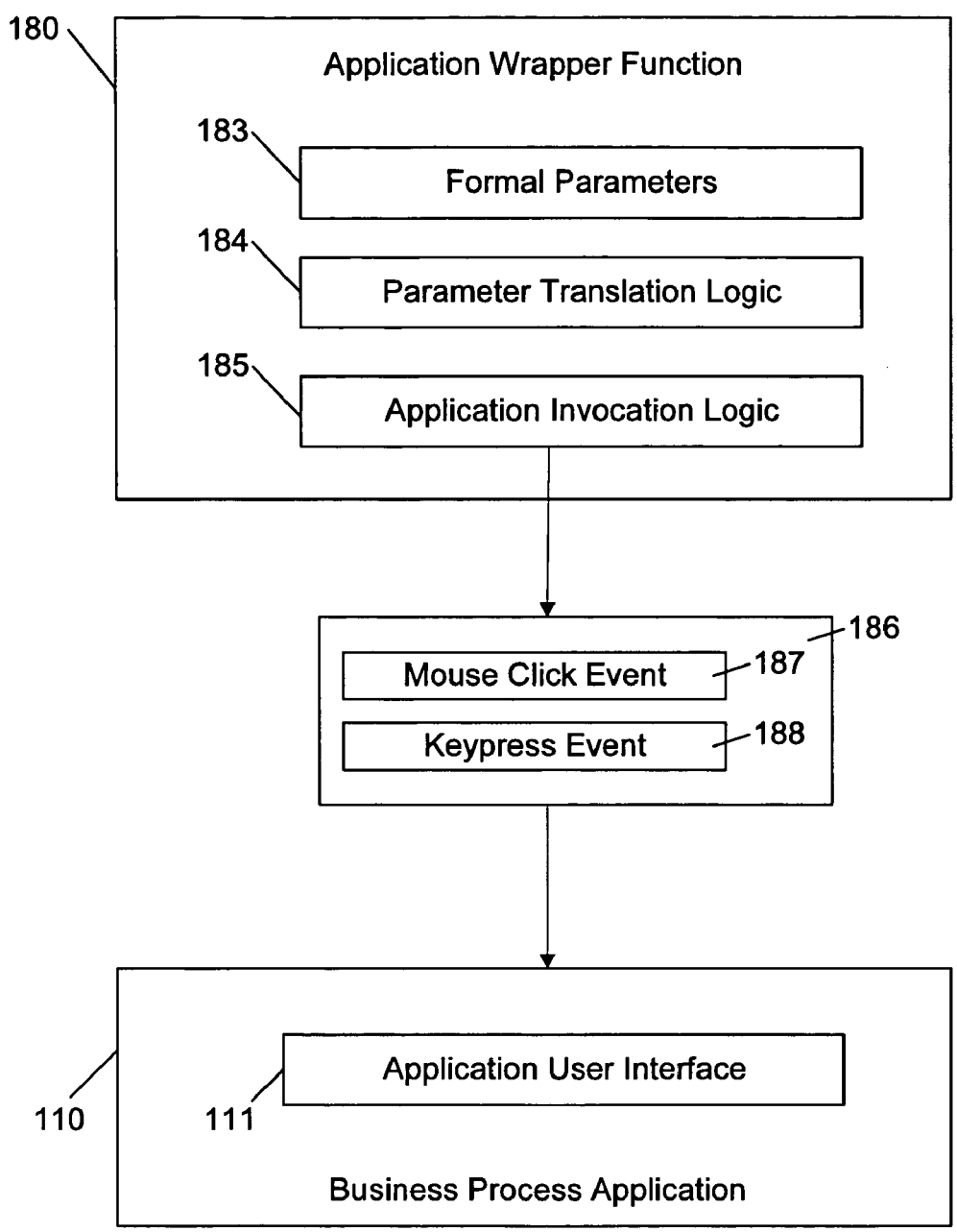
FIG. 1d is an illustrative drawing of an application wrapper function according to one embodiment of the invention.

FIG. 1d is an illustrative drawing of an application wrapper function 180 according to one embodiment of the invention. The application wrapper function 180 is one of the application wrapper functions 151 illustrated in FIG. 1a. The application wrapper function 180 interacts with an application user interface 111 of a business process application 110. The application wrapper function 180 sends input events to the application user interface 111, e.g. key press events, mouse click events, and cursor position events. These input events correspond to the events that would be generated by a user interacting with the application 110. The application wrapper function 180 can be called by computer program code, e.g. by a test script executing a business process test, to interact with the application 110 in the same way that an actual user would interaction with an application.

The application wrapper functions 180 has an optional set of one or more formal parameters 183, each of which can receive a value from an invoker. An application wrapper function can be invoked by an invoker such as the element 180 of FIG. 1b or the business process test 170 of FIG. 1c. An application wrapper function 180 and may include parameter translation logic 184, which, if present, converts one or more of the formal parameters 183 to a format suitable for input to an application user interface 111 of a business process application 110, thereby allowing a broader range or different set of parameter values to be passed to an application wrapper function 180 than are directly accepted by the application interface logic 110. For example, the parameter translation logic 184 may convert the value "today", when specified in a date parameter, into a date value representing today's date, e.g. Jun. 23, 2005. As another example, the parameter translation logic 184 may replace spaces with underscores in input values for fields that do not allow spaces. Some or all of the formal parameters 183 may not be subject to parameter translation logic; such parameters can be passed unchanged to the application user interface 111.

An application wrapper function also includes application invocation logic 185, which invokes the application user interface 111 to perform an application operation associated with the wrapper function 180. The application invocation logic 185 sends events 186 to the application user interface 111 to interact with the application. Examples of events include a mouse click event 187 representing a click of a mouse button when a mouse pointer is at a particular screen location, or a key press event 188 representing an alphabetic key, a numeric key, or an Enter key. The application invocation logic 185 passes the formal parameters 183 and other values which may be generated by the parameter translation logic 184 or by the application invocation logic 185 to the application user interface 111 as necessary to perform the application operation. For example, application invocation logic may set the value of a text field in an SAP application by invoking application interface functions named ffSAPSession and EditField, as shown in the following example of application invocation logic 111 implemented in the VBScript™ programming language:

ffSAPSession.EditField(ObjectIdentifier&fieldName).Set value

In that example, field and value are examples of formal parameters 183. The ffSAPSession call retrieves a particular user interface session and invokes the EditField function on that session to set the value of a user interface text edit field. ffSAPSession is a variable initialized once upon loading. The particular user interface field to be set is specified by the ObjectIdentifier & fieldname parameter. The ObjectIdentifier portion indicates that a user interface object identifier is being passed, and the fieldName portion is the actual identifier that specifies the particular field. A Set function is invoked to set the value of the user interface field to the value parameter. For example, if field is "Pi" and value is 3.14, this statement will set the "Pi" user interface field of the application to the value 3.14.

An application wrapper function 180 may be stored in a file, e.g. a library file, or in a similar computer-readable storage medium. There is a set of application wrapper functions, stored in a set of files, for each application to be tested, e.g. a set of files containing application wrapper functions for testing SAP configurations, and another set containing application wrapper functions for testing Siebel configurations.

The simple elements 140 and the application wrapper functions 151 may invoke a global function (not shown), which is one of the global functions 152. A global function performs a general-purpose task such as sending an electronic mail message. A global function may be implemented as computer program code in a programming language, e.g., VBScript or the like. A global function may be called by multiple elements or global functions, and may be stored in a file, e.g. a library file.

The elements, the application wrapper functions, and the global functions are stored in the test library 101 of FIG. 1a, which may be, for example, a set of one or more files stored on a disk from which they can be loaded. When an element is invoked, it loads all the files that it will use, including the library, to ensure that all of the functions contained in the library are available for execution.

When a business process test 170, an element or an application wrapper function invoked by an invoker, i.e. another test, element, or wrapper function (depending on the type of invoker), finishes executing, either successfully or with an error, execution continues at the next test, element, wrapper function or scripting language statement in the invoker's list or script. The invoker evaluates an error status of the invocation, which may be a status value returned by underlying wrapper functions. The status value may indicate that an error has occurred, e.g. when an error is encountered by a wrapper function while interacting with the application, or an error is detected based on a condition defined in a business process test 170. The invoker continues executing until all tests, elements, or wrapper functions in its list have been executed, or an error status indicating a failure is returned by one of the tests, elements, or wrapper functions that the invoker has invoked. If all tests, elements, or wrapper functions in the invoker's list have been successfully executed, the invoker finishes execution and passes control back to its own invoker, which continues to invoke tests, elements, or wrapper functions in its own list.

FIG. 1e is an illustrative drawing of a business process test environment 191, which includes business process test development environment 190, a script generator 178, and a test script 193 according to one embodiment of the invention. The development environment 190 includes a user interface such as a graphical user interface (not shown), which allows a user 195 to select elements from a list 196 of predefined elements to create a business process test 141, e.g. by dragging and dropping predefined elements from the list 196. The predefined elements are the complex elements 130 and simple elements 140 provided by the test library 101 of FIG. 1a. The elements invoke application wrapper functions 151 to interact with the application interface logic 111. As described above with reference to FIG. 1a, the business process test 170 includes a list of element calls 171, and each element call 172 includes an actual parameter list 173. An actual parameter 174 in the list 173 may include an input parameter value. The input parameter value is provided by either the test development environment 190, e.g. as default values, or by the user 195, typically at the time the business process test 170 is developed by the user 195. A script generator 178 shown in FIG. 1e converts the business process test 170 into the test script 193. The test script 193 can perform the business process test 170 by invoking a business process application, as described below. The test script 193 includes computer program code in a programming language similar to Visual Basic™ and can be stored in a file for later use, or for use by other testing systems.

Figure 1F:
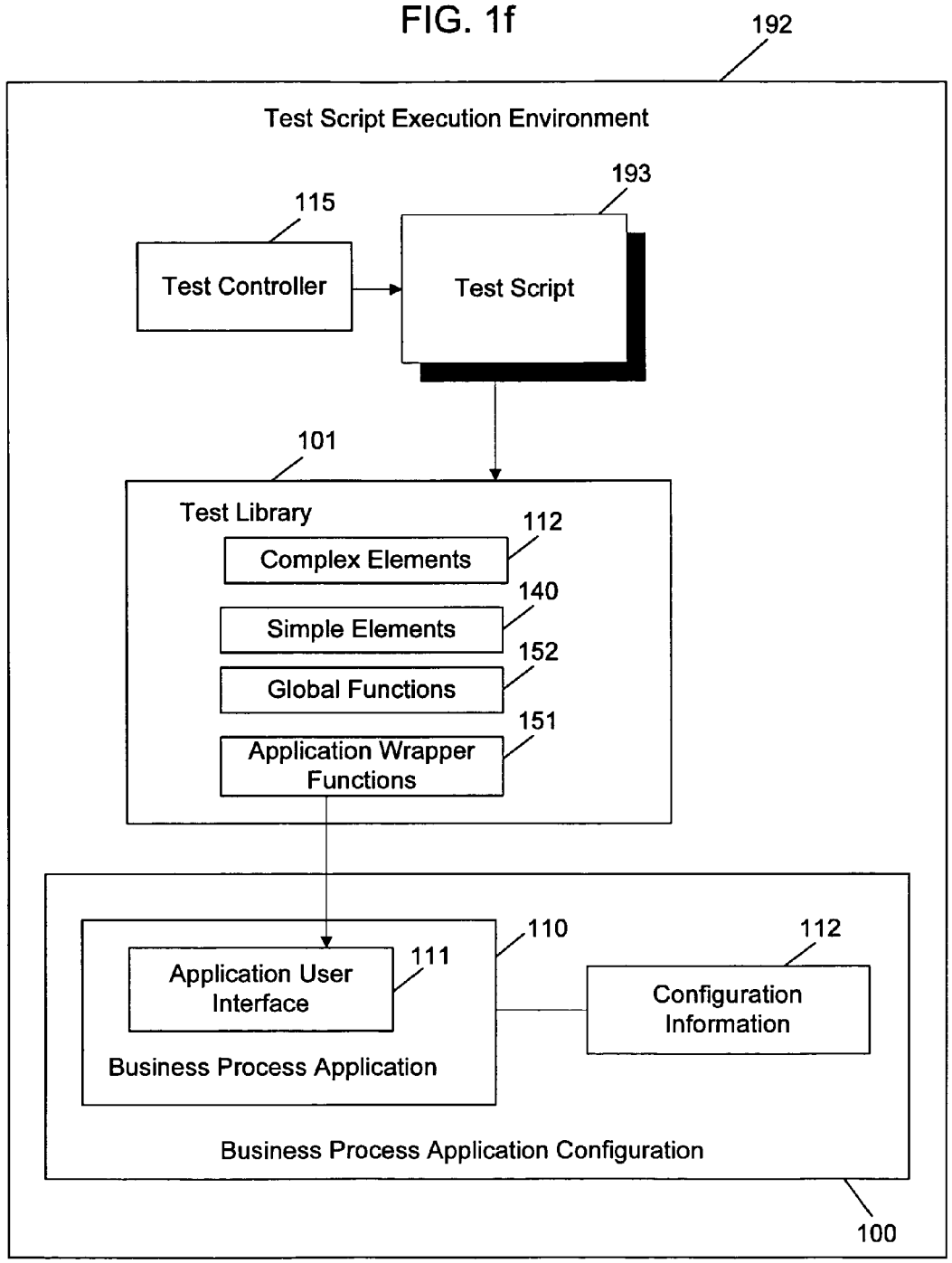
FIG. 1f is an illustrative drawing of a test script execution environment according to one embodiment of the invention.

FIG. 1f is an illustrative drawing of a test script execution environment 192 according to one embodiment of the invention. The test script execution environment 192 may be, for example, a computer operable to execute both a business process application 110 and the test script 193. The test script execution environment 192 includes business process application configuration 100, the test script 193 for testing the business process application configuration 100, and a test controller 115 for initiating execution of the test script 193, according to embodiments of the invention. The test controller 115 may be, for example, a user or a computer program for starting and stopping tests. The business process application configuration 100 includes business process application software 110, e.g. SAP, Siebel, or the like, and corresponds to an installation or deployment of the business process application 110. The business process application 110 includes application interface logic 111, which may be, for example, a graphical user interface. The business process application 110 also includes a configuration 112, which may include business processes (not shown) and other configuration information specific to a particular user organization or specific to a particular computer installation.

The test script 193 is executed in response to commands from the test controller 115, to perform automated testing of the Business Process Application 110. The test controller 115 may be, for example, a human operator or a computer-executable script. When the test script 193 is executed, it performs the business process test 170 of FIG. 1e by invoking the application wrapper functions 151 and global functions 152 of the test library 101 to request the application 110 to perform the operations specified by the business process test 170. The wrapper functions 151 in turn invoke the application interface logic 111, e.g. the ffSAPSession and EditField functions, which initiates the requested operations in the application 110.

FIG. 2 is an illustrative drawing of a flowchart of the abstract steps performed by an application wrapper function 180 according to one embodiment of the invention. An application wrapper function 180 begins by translating input parameters at step 202 and generating application-specific parameters at step 203. For example, an input parameter named "today" might be translated to "Jun 27, 2005" for a date field. Next, at step 204, the application wrapper function 180 invokes an application interface function, e.g. an application user interface function to set a field value. Finally, at step 205, the application wrapper function retrieves a result from the application and returns the result to the function or element that invoked the application wrapper function. The result may be a success or failure error status code, or a value retrieved from a text field.

Figure 3:
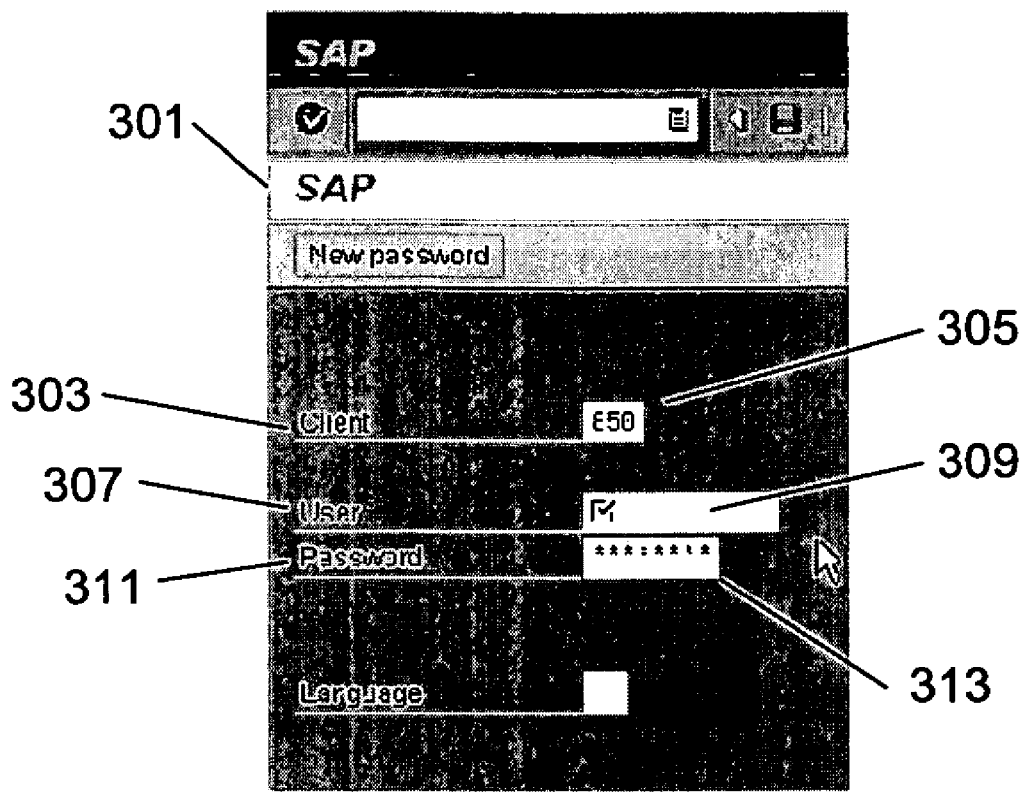
FIG. 3 is an illustrative drawing of an application screen filled in with data according to one embodiment of the invention.

FIG. 3 is an illustrative drawing of an application screen filled in with data according to one embodiment of the invention. The application screen shown in FIG. 3 is a login user interface screen 301 of an SAP business process application. The user interface screen 301 includes a set of text fields. Each text field has a name and a value. In particular, the Client field 301 has a value 305, the User field 307 has a value 309, and the Password field 311 has a value 313. These values are filled in automatically by the test script when it executes a business process test that calls a Set_Text Application Wrapper Function. In one example, a Test Set invokes a business process test named Start_SAP, which in turn invokes elements named Set_Text to set the Client and User fields to values provided by a user, an element named Set_Password to similarly set the Password field's value, and an element named Press_Enter to send a simulated Enter key press event to the application. Each of these elements in turn invokes a corresponding wrapper function, which actually interacts with the application, e.g., the Set_Text wrapper function, which sets a text field to a specified value, or a wrapper function that sends the simulated Enter key press. The Start_SAP business process test includes the list of elements with associated parameter values shown in the following table.

| Element | Field | Value |
| --- | --- | --- |
| Set_Text | "Client" | Parameter("Client") |
| Set_Text | "User" | Parameter("UserName") |
| Set_Password | "Password" | Parameter("Password") |
| Press_Enter | (None) | (None) |

Referring again to FIGS. 4a and 4b, the business process test 410 includes an ordered list of element calls 411 and actual input parameters 412 associated with the element calls. A user uses the development environment 401 to create the business process test 410 by selecting elements from a list of pre-defined elements 420 to create an ordered list of element calls, 411 which, along with the actual parameter values 412, forms a business process test 410. Examples of elements include a Login element, which performs the actions necessary to log into the application, and a Goto_Transaction element, which performs the actions necessary to select a business process in the application. The elements can probably best be understood as programmed simulations of the actions taken by a user of the application. The elements can perform the same actions that a user would perform, and can be called by business process tests to repeatedly and reliably test the application by performing application operations and interactions.

Each element call has a set of required formal input parameters, and each parameter has a default actual value. Examples of formal parameters include a user name parameter 12 for a Login element 2, and a transaction name 13 for a Goto_Transaction element 3. A user may provide actual values for the parameters, which will be passed to the element when the business process test 410 is executed. The list of pre-defined elements 420 includes pre-defined elements that interact with the application to perform actions. The list of elements 420 includes an element for substantially all possible interactions with the application. Examples of elements in the list of predefined elements 420 include common elements for use in all types of tests, such as a Launch SAP element 422, which starts an SAP application, a Login element 423, which logs into the application, a Goto_Transaction element 421, which selects a specific transaction (i.e. business process) in the application, and a Press_Enter element 424, which sends an Enter key press to the application. Further examples of elements in the list 420 include application-specific elements for use in tests of specific functions of the application. Examples of application-specific elements include elements for filling in field values in a Create Sales Order transaction, such as an Initial Screen element 425, an Overview element 427, and a Header_Data element 429, which fill in values for an Initial Screen, an Overview screen, and a Header Data screen, respectively, of the Create Sales Order transaction. The details of how the elements perform their associated actions are hidden from the user. The elements may be implemented in a programming language, e.g. Visual Basic or the like, and may call application wrapper functions. Elements may also be composed of other elements.

The elements of the business process test 410, e.g., a Launch SAP Connection, Login, and so on, are selected by a user from the list of predefined elements 420, e.g. by first selecting the predefined Launch SAP element 421, then selecting the predefined Login element 422, and so on, typically according to a test plan. The user may also providing values for input parameters, e.g. according to a test plan. The order of the elements in the business process test 410 determines the order in which the elements will be executed when the test is executed.

The elements calls of the business process test 410 of FIG. 4*a* include, in order, a Launch SAP element call 1, which has an associated System actual parameter 11, a Login element call, which has associated User Name and Password actual parameters 12, a Goto_Transaction element call 3, which has an associated transaction actual parameter 13, a VA01 Initial Screen element call 4, which has an associated Order Type actual parameter 14, a Press_Enter element call 5, which has an associated transaction actual parameter 15, a VA01 Overview element call 6, which has an associated SoldTo Party actual parameter 16, a Press_Enter element call 7, which has an associated transaction actual parameter 17, a Press_Button element call 8, which has an associated button name actual parameter 18, a VA01 Header Data element call 9, which has an associated Initiator actual parameter 19. The business process test 410 continue in FIG. 4*b* with a Press_Enter element call 10, which has an associated transaction actual parameter 20, and finally, a Save_Record element call 11, which has an associated SalesOrder_Number actual parameter 21. Unlike the previously mentioned actual parameter values, which are included as constant values in the business process test 410, the SalesOrder_Number actual parameter value is determined when the test is run, either by being read from a spreadsheet, or by a user entry in a user interface dialog box, e.g. of the Test Development Environment user interface 401, if the business process test 410 is executed in the Test Development Environment 401 for purposes of testing the business process test 410. As with the previously-mentioned element calls, a user has added the Save_Record element call is to the element call list 411 by dragging and dropping the Save_Record element 430 from the predefined element list 420. The user has supplied the RecordNumber actual parameter 21 by entering the value SalesOrder_Number in a dialog box of the Test Development Environment user interface 401.

Figure 5A:
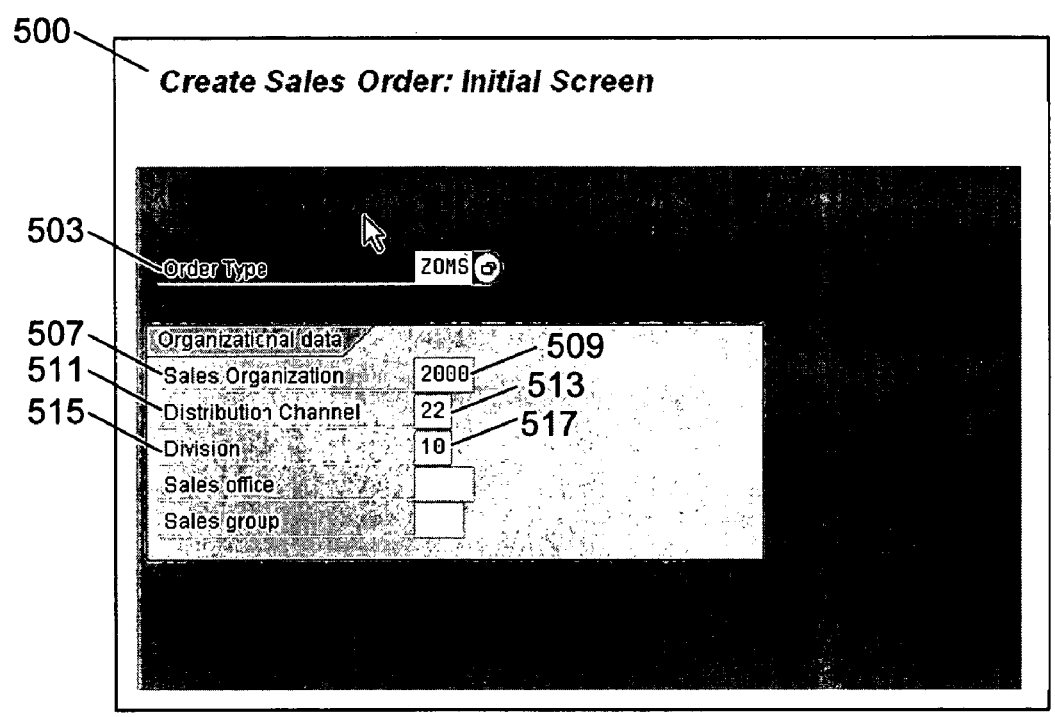

FIG. 5*a* is an illustrative drawing of an application screen filled in with data according to one embodiment of the invention. The application screen of FIG. 5*a* is a Create Sales Order Initial Screen 500 of an SAP application. The actual values for four fields of the Initial Screen 500 have been set in the screen 500 by the VA01 Initial Screen element call 4 of FIG. 4*a* as a result of execution of a test script based on a business process test 410, such as the business process test 410 of FIG. 4*a*. The filled-in fields are an OrderType 503 with a value 505, a Sales Organization field 507 with a value 509, a Distribution Channel field 511 with a value 513, and a Division field 515 with a value 517. These values have been filled in by corresponding calls to the Set_Text application wrapper function. Those calls were invoked by the Create VA01 Initial Screen element call 4 of FIG. 4*a*, which was in turn invoked by the business process test 410. For example, the Division field value 517 was set by the VA01 Initial Screen element, which called Set_Text and passed a field parameter with the value "Division" to the Set_Text function.

Figure 5B:
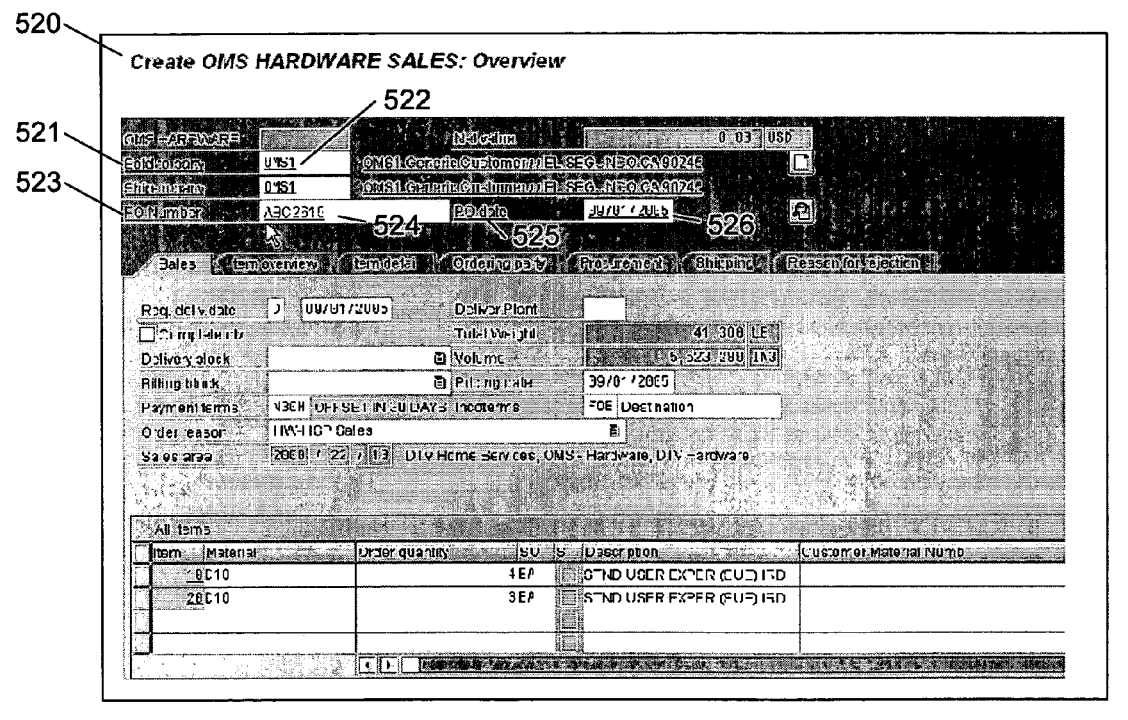

FIG. 5*b* is an illustrative drawing of an application screen filled in with data according to one embodiment of the invention. The application screen of FIG. 5*b* is a Create OMS Hardware Sales Overview screen 520 of an SAP application. The values of several fields of the Overview screen 520 have been set by the VA01 Overview element 7 as a result of execution of a test script based on a business process test, such as the business process test 410 of FIG. 4*a*. The filled-in fields include a Sold-to party field 521 with a value 522 that has been set to OMS1, a PO Number field 523 with a value 524 that has been set to ABC2619, and a PO date field 525 with a value 526 that has been set to Sep. 01, 2005. The values 522 and 524 were supplied by the business process test 410 as actual parameters to the VA01 Overview element 7 of FIG. 4*a*. Note that the date Sep. 01, 2005 was generated automatically by the Set_Text wrapper function, which was invoked by the VA01 Overview element 7, which was in turn invoked by the business process test 410 with an actual parameter value of "today" for the element's PO date parameter.

Figure 5C:
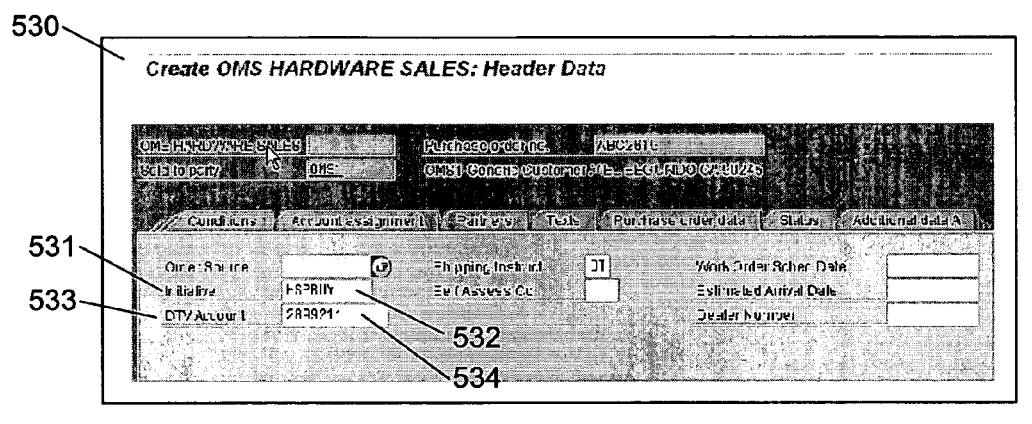

FIG. 5*c* is an illustrative drawing of an application screen filled in with data according to one embodiment of the invention. The application screen of FIG. 5*c* is a Create OMS Hardware Sales Header Data screen 530 of an SAP application. The values of several fields of the Header Data screen 530 have been set by the VA01 Header Data element call 11 of FIG. 4*b* as a result of execution of a test script based on a business process test, such as the business process test 410 of FIG. 4*a*. The filled-in fields include an Initiative field 531 with a value 532 that has been set to HSPBUY, and a DTV Account field 533 with a value 534 that has been set to 2899211. The values 532 and 534 were supplied by the business process test 410 as actual parameters to the VA01 Header Data element 11 of FIG. 4*b*.

Figure 6:
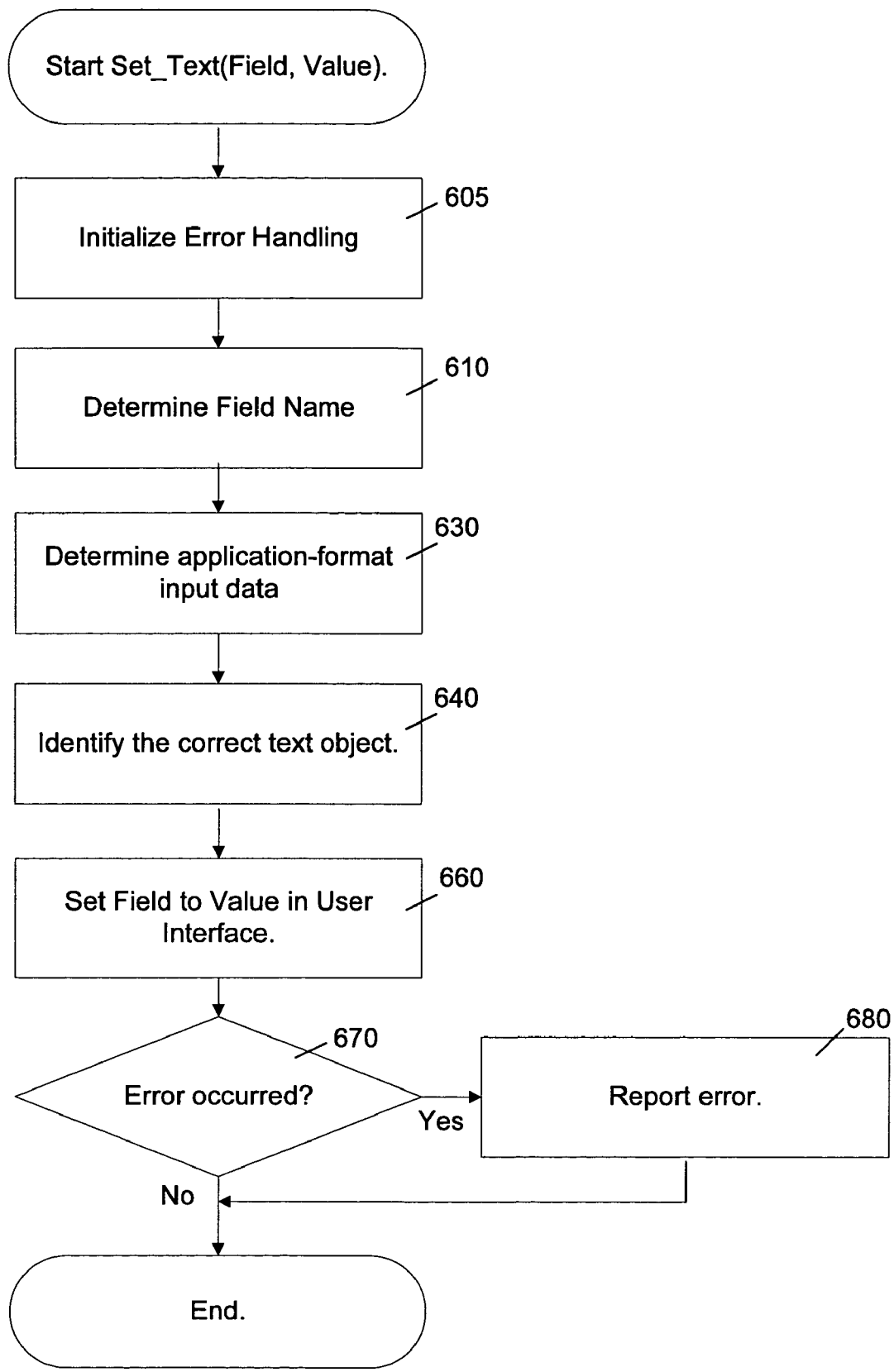
FIG. 6 is an illustrative drawing of a flowchart of the steps performed by an application wrapper function according to one embodiment of the invention.

FIG. 6 is an illustrative drawing of a flowchart of the steps performed by an application data input wrapper function according to one embodiment of the invention. The wrapper function of FIG. 6 is named Set_Text, and provides data input to an application by setting the text content of a text field in the application's user interface to a given value. With reference to FIG. 1*a*, the Set_Text wrapper function is an example of a data input wrapper function 153. This Set_Text wrapper function provides an implementation of a corresponding Set_Text element for use by business process tests, and is specific to the SAP business process application. The Set_Text wrapper function has two input parameters: "Field", which is the name of a text field, and "Value", which is a text value to which the text field is to be set. In step 605, Set_Text initializes the VBScript™ error handling system. The field name is determined in step 610. In step 630, Set_Text performs parameter translation to determine application-format input data, which includes replacing spaces in the field name with underscores, and replacing the special value "today" or "tomorrow" with the appropriate date value, based on checks for those special values. In step 640, Set_Text locates a user interface field. In step 650, Set_Text sets the user interface field specified by the Field argument to Value. For example, to set a user interface field in the SAP user interface, Set_Text invokes the application function Set on a text field object returned by EditField. EditField is invoked on a user interface session object returned by ffSAPSession. The Set function is invoked as follows:

ffSAPSession.EditField(ObjectIdentifier&fieldName).Set Value

This application invocation sets the content of the text field specified by the field parameter to the value specified by the Value parameter. The ffSAPSession and EditField calls shown above are examples of application invocation logic. Note that there is no need for the user to supply a session because a constant session name is used. The ffSAPSession object is initialized when the library that contains it is loaded. Finally, at step 670, the Set_Text function checks for errors that may have occurred in the previous step of invoking the application interface functions and, if an error occurred, reports the error at step 680.

Figure 7:
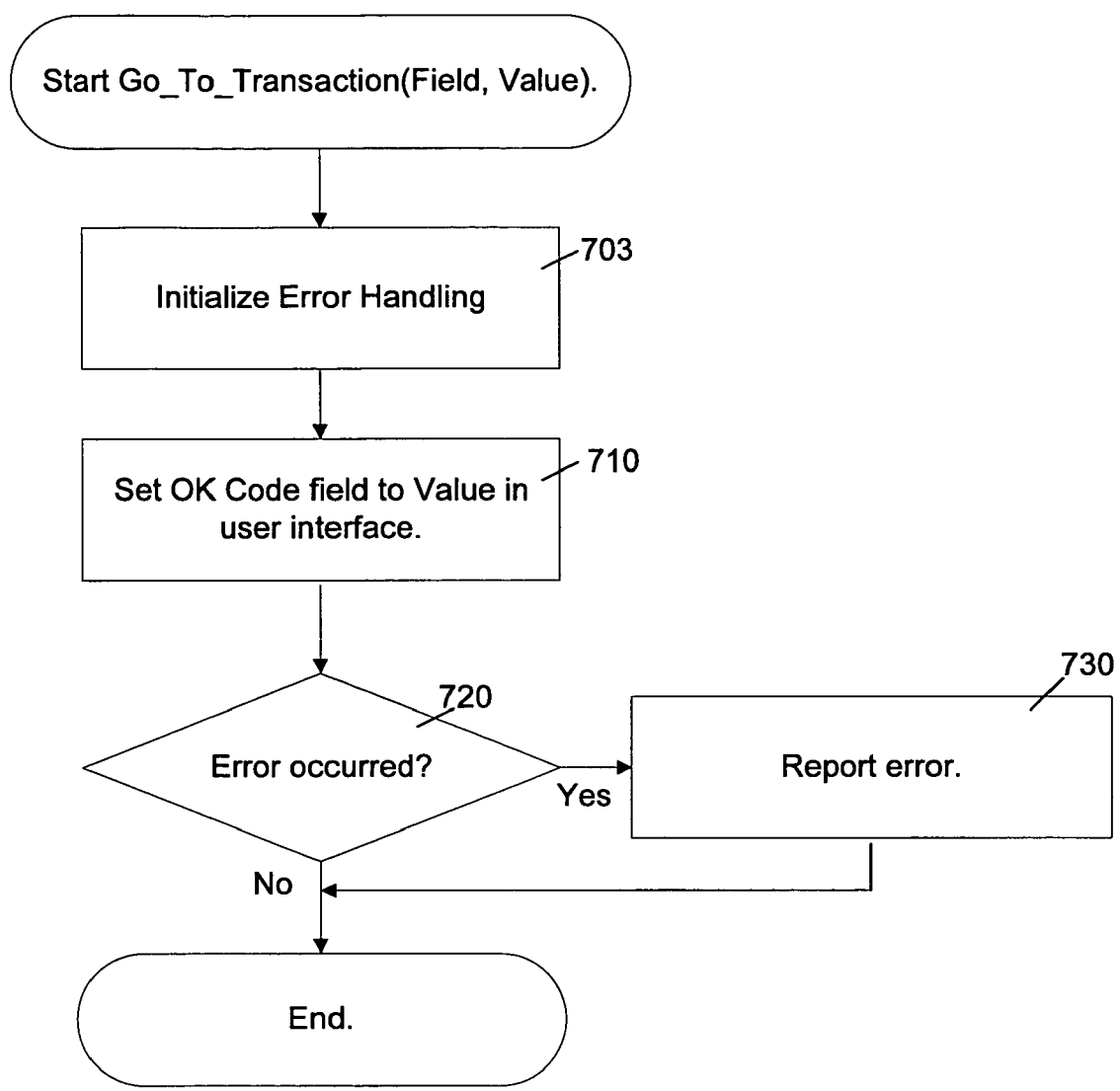
FIG. 7 is an illustrative drawing of a flowchart of the steps performed by a specific application wrapper function according to one embodiment of the invention.

FIG. 7 is an illustrative drawing of a flowchart of the steps performed by an application control wrapper function according to one embodiment of the invention. The application wrapper function of FIG. 7 is named Go_To_Transaction, and causes the user interface to select a specific transaction. With reference to FIG. 1a, the Go_To_Transaction wrapper function is an example of a control wrapper function 154. This Go_To_Transaction application wrapper function provides an implementation of a corresponding Go_To_Transaction element for use by business process elements and is specific to the SAP business process application. The Go_To_Transaction wrapper function has a "Value" input parameter which is the name of the transaction to select. Go_To_Transaction begins by initializing error handling at step 703. At step 710, the value of a user interface field that receives a transaction name is set to the "Value" input parameter. For example, in the SAP user interface, Go_To_Transaction invokes the application functions Set and Click on user interface objects returned by SAPGuiOkCode and SAPGuiButton, respectively. Specifically, the application functions are invokes as follows:

ffSAPSession.SAPGuiOkCode
("Type=GuiOkCodeField").Set "/n"&Value
ffSAPSession.SAPGuiButton("tooltip=ENTER.*").Click The SAPGuiOkCode invocation sets the value of the OkCode field in the session named by "Session" to the transaction value passed as input to Go_To_Transaction. Note that the ffSAPSession and EditField calls shown above are examples of application invocation logic. Finally, at step 720, the Go_To_Transaction checks for errors that may have occurred in the previous step, and, if an error occurred, reports the error at steps 730.

The Set_Text application wrapper function provided in Appendix A is a VBScript™ implementation of the steps shown in the flowchart of FIG. 6, and the Go_To_Transaction application wrapper function in Appendix A is a VBScript™ implementation of the steps shown in the flowchart of FIG. 7. The application wrapper functions provided in Appendix A check for errors by calling a checkErrorHandler global function, which is also provided in Appendix A. The checkErrorHandler function retrieves a global error status indicator variable named Err.Number, and reports an error if Err.Number is nonzero. The error is reported by calling the reportDebugLog function with a message string constructed from Err.Number and an associated global error description variable named Err.Description.

With reference to FIG. 1a, changes to, evolution of, or maintenance of the test library 101 can be performed at any of the levels, which include the business process test level 120, the element levels 130 and 140, and the function level 150. Since these levels are mainly composed of files that could be executed but are not required to be executed, new information and logic can be added by simply adding or updating files. Since the testing logic is distributed across multiple files, for example, with one or two functions per file, it is feasible for multiple test developers to modify different portions of the test simultaneously, as long as each developer is working with a different file.

The techniques and embodiments of described above provide the advantageous features of automatically testing a business process application via its user interface, and insulating the business process tests and test development environment from many changes that may occur in the business process application being tested. For example, with the techniques described above, a business process test that interacts with the user interface of an application will continue to operate correctly when many types of changes are made to the application's user interface, such as addition or removal of user interface elements.

The business process test is flexible and robust in the face of changes to the application. Test scripts created according to the application-specific element principles described herein continue to function when many types of changes are made to the application being tested, such as changes that do not directly affect the names and types of application elements referred to by the test scripts. The test scripts will continue to function correctly when such changes are made to the application. For example, if the application is upgraded from Siebel version 6 to version 7, the test scripts will continue to function correctly. As another example, the test scripts will continue to function correctly if the layout of elements on a screen, such as name and password fields on a login screen, is changed, because the application-specific elements are independent of screen layout details.

The above description is exemplary only and it will be apparent to those of ordinary skill in the art that numerous modifications and variations are possible. For example, various exemplary methods and systems described herein may be used alone or in combination with various other computer and computer peripheral systems and methods. Additionally, particular examples have been discussed and how these examples are thought to address certain disadvantages in related art. This discussion is not meant, however, to restrict the various examples to methods and/or systems that actually address or solve the disadvantages.

APPENDIX A

```
' Function Set_Text
' Enters a specified value inside a text box
' Parameters:        fieldName :The attached text of a text box;
val: the data to input
Sub Set_Text(fieldName, val)
    on error resume next
    ' Datatable fields do not support spaces, so replace with
    underscore
    newfield = replace(fieldName, " ","_")
    select case lcase(val)
        case "today"
            val = IsDate(CDate( ))
        case "tomorrow"
            val = IsDate(DateAdd(d, 1, CDate))
    end select
    if val == "" then
        ' Do not perform any action if data was not provided
        reportLog "DataTable Field: " & fieldName & "is
        Empty / Notprovided"
    else
        reportLog "Get DataTable Field: " & fieldName & ", val:
        " & val
        if ffSAPSession.EditField("index=0",
        "ObjectIdentifier=" & fieldName).Exist then
            ffSAPSession.EditField("index=0",
            "ObjectIdentifier=" & fieldName).Set val
        end if
    end if
    checkErrorHandler( )
End Sub
' Function Go_To_Transaction -- Performs the Go_To_Transaction
function
' Parameter:        Transaction - Transaction name (eg VA01)
Sub Go_To_Transaction
    if Transaction = "" then
        ' Do not perform any action if data was not provided
        reportLog "DataTable Field " & Transaction & " is
        Empty/Not provided"
    else
        reportLog "Get DataTable Field: " & Transaction
        ffSAPSession.SAPGuiOKCode("Type=GuiOkCodeField").Set
        "/n" & Transaction
        ffSAPSession.SAPGuiButton("tooltip=ENTER").Click
    end if
    checkErrorHandler( )
End Sub
' Function checkErrorHandler -- Error handler for all implementations
```

APPENDIX A
-continued

```
of on error resume next
function checkErrorHandler( )
    checkErrorHandler=Err.Number
    If Err.Number = 0 Then exit function
    Msg = "***** RAISED ERROR DETECTED *****" & _
        "Error: " & CStr(Err.Number) &_
        "Description: " & Err.Description &_
        "Source: " & Err.Source
    reportDebugtLog(Msg)
    Err.Clear
end function
```

APPENDIX B

List of elements for performing transactions
with the SAP business process application:

Quote to Cash category:

| | |
|---|---|
| MB02 | Change Material Document |
| MB03 | Display Material Document |
| MB1A | Enter Goods Issue |
| MB1B | Transfer Goods |
| MB21 | Create Reservation |
| MB22 | Change Reservation |
| MB23 | Display Reservation |
| MB24 | Display Reservations for Material |
| MB25 | Reservations by Account Assignment |
| MEK1 | Create Condition Records |
| MEK2 | Change Condition Records |
| MEK3 | Display Condition Records |
| MELB | Purchasing Transaction per Requirement Tracking Number |
| MM01 | Create Material |
| VA01 | Create Sales Order |
| VA02 | Change Sales Order |
| VA03 | Display Sales Order |
| VA05 | List of Sales Orders |
| VA22 | Change Quotation |
| VA23 | Display Quotation |
| VA25 | List of Quotations |
| VF03 | Display Billing Document |
| VF04 | Maintain Billing Due List |
| VL02 | Change Outbound Delivery |
| VL03 | Display Outbound Delivery |
| VL04 | Sales Orders/Purchase Orders Worklist |

Procure to Pay:

| | |
|---|---|
| MB01 | Goods Receipt for Purchase Order |
| MB0A | Post Goods Receipt w - Unknown PO |
| MB1C | Post Goods Receipt - No PO |
| MB90 | Output from Goods Movement |
| MC75 | Transfer Planning Data to Demand Management |
| MC76 | Change Plan |
| MC81 | Create Plan |
| MC85 | Display Product Group |
| MD01 | MRP Run |
| MD04 | Stock/Requirement List |
| ME11 | Create Info Record |
| ME13 | Display Info Record |
| ME21 | Create Purchase Order |
| ME22 | Change Purchase Order |
| ME23 | Display Purchase Order |
| ME27 | Create Purchase Order (STO) |
| ME28 | Release (Approve) Purchasing Documents |
| ME2A | Monitor Vendor Confirmations |
| ME2B | List Display Purchase Orders (PO and PO Releases) |
| ME2C | Purchasing Documents per Material Group |
| ME2J | Purchasing Documents per Project |
| ME2K | Purchasing Documents per Account Assignment |
| ME2L | Purchasing Documents per Vendor |
| ME2M | Purchasing Documents for Material |
| ME2N | Purchasing Documents per Document Number |
| ME2W | Purchasing Documents per Supplying Plant |
| ME31K | Create Contract |

APPENDIX B-continued

List of elements for performing transactions
with the SAP business process application:

| | |
|---|---|
| ME31L | Create Scheduling Agreement |
| ME32K | Change Contract |
| ME32L | Change scheduling Agreement |
| ME33K | Display Contract |
| ME33L | Display Scheduling Agreement |
| ME38 | Maintain Sch. Agmt. Schedule |
| ME39 | Display Sch. Agmt Delivery Schedule |
| ME3B | Purchasing Documents per Requirement Tracking Number |
| ME3C | Purchasing Documents per Material Group |
| ME3L | Purchasing Documents per Vendor |
| ME3M | Purchasing Documents for Material |
| ME3N | Purchasing Documents per Document Number |
| ME41 | Create RFQ |
| ME42 | Change RFQ |
| ME47 | Maintain Quotation |
| ME49 | Price Comparison List |
| ME51 | Create Purchase Requisition |
| ME52 | Change Purchase Requisition |
| ME53 | Display Purchase Requisition |
| ME56 | Assign Source of Supply to Requisitions |
| ME5A | List Display of purchase Requisitions |
| ME5K | List Display of purchase Requisitions |
| ME80F | Purchasing Documents |
| ME80R | Purchasing Documents |
| ME81 | Analysis of Order Values |
| ME84 | Create Releases |
| ME9F | Message Output |
| MK01 | Create Vendor |
| MK02 | Change Vendor |
| MK03 | Display Vendor |
| VA01 | Create Sales Order |
| VF04 | Maintain Billing Due List |
| VF06 | Create Background Jobs for Billing |
| VL31 | Create Inbound Delivery |
| VL31N | Create Inbound Delivery |
| VL32 | change Inbound Delivery |
| VL32N | Change Inbound Delivery |
| VL33 | Display Inbound Delivery |
| VL71 | Output From Deliveries |

Utility Category:
  SE16 Data Browser
  SE37 Function Builder
  SE38 ABAP Editor Complex Elements: Quote to Cash Category:
1. Sales Orders
   VA01 Create Sales Order
   VA03 Display Sales Order
   VL03 Display Outbound Delivery
   VL02 Change Outbound Delivery
   VA22 Change Quotation
   VA23 Display Quotation
   VA25 List of Quotations
   VL04 Sales Order/Purchase Orders Worklist
   VF04 Maintain Billing Due List
2. Bulk Return Material Authorization (RMA)
   VA01 Create Sales Order
   VA03 Display Sales Order
   VA02 Change Sales Order
   VL04 Sales Order/Purchase Orders Worklist
3. Individual RMA
   VA01 Create Sales Order
   VA03 Display Sales Order
   VA02 Change Sales Order
   VL04 Sales Order/Purchase Orders Worklist
4. Refurbishment
   VA01 Create Sales Order
   VA03 Display Sales Order VA02 Change Sales Order
VL04 Sales Order/Purchase Orders Worklist Complex Elements: Procure to Pay Category:
1. Regular Procurement
    ME21 Create Purchase Order
    ME9F Message Output
    MB01 Goods Receipt for Purchase Order
    MIRO Enter Incoming Invoice
2. Procurement
    MD01 MRP Run
    MD04 Stock requirements List
    ME21N Create Purchase Order
    ME22N Display Purchase Order
    ME23N Display Purchase Order
    VL31N Create Inbound Delivery
    MB01 Goods Receipt for Purchase Order
4. Hardware Procurement
    VA01 Create Sales Order
    MD04 Stock requirements List
    ME21N Create Purchase Order
    ME22N Display Purchase Order
    ME23N Display Purchase Order
    VL31N Create Inbound Delivery
    MB01 Goods Receipt for Purchase Order

What is claimed is:

1. A business process test library stored in a computer-readable medium, comprising:
    application wrapper function logic for interacting with a business process application that executes a group of business processes that each specifies a sequence of activities to be performed in a specified order as represented by a sequence of user interface screens of a runtime of the business process application, the application wrapper function logic having a control portion and a data input portion, where each user interface screen has a screen layout of data and control as represented by user interface components to represent the business process;
    data input element logic operable to invoke the data input portion to provide automated test input data for a business process of the business process application, the data input portion to provide the test input data by directly referencing a data input interface component, independent of a screen layout of a data input interface of an interface screen of a runtime of the business process application of which the data input interface is a part, the screen layout including the location or size of user interface components within the screen layout of the interface screens; and
    control element logic operable to invoke the control portion to perform an automated business process completion operation, the control portion to perform the business process completion operation by directly referencing a control interface component, independent of a screen layout of a control interface of an interface screen of the runtime of the business process application of which the control interface is a part;
    wherein the application wrapper function logic invokes the data input element logic and the control element logic to transfer automated test input data to the business processes to simulate user interaction with the business process application and trigger operations of the business process application to test execution of every business process in the group based on the test input data, including testing every possible path of execution by executing each conditional and repeated sequence of activities defined by the business processes by providing elements for each interaction of every business process in the group.

2. The business process test library of claim 1, wherein the data input portion of the application wrapper function logic provides text input to the application.

3. The business process test library of claim 1, wherein the control portion of the application wrapper function logic generates events in a user interface associated with the application.

4. The business process test library of claim 1, wherein the business process completion operation comprises invoking the control portion to generate an Enter key press event in a user interface associated with the application.

5. The business process test library of claim 1, wherein the business process completion operation comprises invoking the control portion to generate an OK button press event in a user interface associated with the application.

6. The business process test library of claim 1, wherein the business process completion operation comprises invoking the control portion to generate a Cancel button press event in a user interface associated with the application.

7. The business process test library of claim 1, further comprising: complex element logic operable to invoke defined portions of the data input element logic, and further operable to invoke defined portions of the control element logic.

8. The business process test library of claim 7, wherein the complex element logic includes a complex element for performing each business process of the group of business processes, which represent some or all of every business process executable by the business process application.

9. The business process test library of claim 7, wherein defined portions of the data input element logic, the control element logic, and the complex element logic can be combined to invoke any business process provided by the application.

10. The business process test library of claim 7, wherein a first portion of the complex element logic is operable to invoke a defined second portion of the complex element logic.

11. The business process test library of claim 7, further comprising: business process test logic operable to invoke defined portions of the complex element logic.

12. The business process test library of claim 11, wherein the business process test logic comprises:
    an invocation list having at least one call to a defined portion of control element logic, the invocation list associated with an actual parameter list, wherein the actual parameter list is passed to the defined portion of control element logic during execution of the call by a test script.

13. The business process test library of claim 11, wherein the business process test logic comprises:
    an invocation list having at least one call to a defined portion of complex element logic, the invocation list associated with an actual parameter list, wherein the actual parameter list is passed to the defined portion of complex element logic during execution of the call by a test script.

14. The business process test library of claim 1, further comprising:
    business process test logic operable to invoke defined portions of the data input element logic, and further operable to invoke defined portions of the control element logic.

15. The business process test library of claim 1, wherein the data input element logic comprises:

an invocation list having at least one function call for invoking a defined portion of the data input portion of the application wrapper function logic.

16. The business process test library of claim 1, wherein the control element logic comprises:

an invocation list having at least one function call for invoking a defined portion of the control portion of the application wrapper function logic.

17. The business process test library of claim 1, wherein the data input element logic includes input elements operable to provide input data for every business process in a predefined set of business processes.

18. The business process test library of claim 17, wherein the control element logic includes control elements for performing business process completion operations for every business process in the predefined set.

19. A computer system for generating a business process test environment, comprising:

a memory device storing:

business process test development environment logic operable to create a business process test from a list of predefined elements to test execution of every business process of a group of business processes based on automated test input data, where each user interface screen has a screen layout of data and control as represented by user interface components and where each business process specifies a sequence of activities to be performed in a specified order as represented by a sequence of user interface screens of a runtime of the business process application, the predefined elements including data input elements to provide automated test input data to a business process of a business process application by directly referencing a data input interface component, independent of a screen layout of a data input interface of an interface screen of a runtime of the business process application of which the data input interface is a part, the screen layout including the location or size of user interface components within the screen layout of the interface screens, and control elements to perform automated business process completion operations by directly referencing a control interface component, independent of a screen layout of a control interface of an interface screen of the runtime of the business process application of which the control interface is a part;

a business process test library for invoking the business process application;

a script generator operable to generate an automated test script based on the business process test, wherein the test script is operable to invoke the test library to perform the business process test to invoke data input elements and control elements to transfer input data to the business processes of the business process application and trigger operations of the business process application to test every business process in the group of business processes, where testing includes testing every possible path of execution by providing elements for each interaction of every business process in the group and executing each conditional and repeated sequence of activities defined by the business processes; and a processor to execute the business process test development environment and the script generator.

20. A method in a computer system of creating elements of a test for a business process test library, comprising the steps of:

accessing a test library having logic to enable a business process test to invoke elements stored within the test library to test a business process application including testing every possible path of execution of a group of business processes of the business process application by executing each conditional and repeated sequence of activities defined by the business processes by providing elements for each interaction of every business process of the group;

adding to the test library application wrapper functions to interact with an application user interface of a business process application that executes the group of business processes that each specifies a sequence of activities to be performed in a specified order as represented by a sequence of user interface screens of a runtime of the business process application, the application wrapper functions operable to invoke automated data input elements and control elements, where each user interface screen has a screen layout of data and control as represented by user interface components;

adding to the test library data input elements, wherein the data input elements provide automated input data for business processes by directly referencing a data input interface component, independent of a screen layout of a data input interface of an interface screen of the runtime of the business process application of which the data input interface is a part, the screen layout including the location or size of user interface components within the screen layout of the interface screens; and adding to the test library control elements, wherein the control elements invoke the application wrapper functions to perform automated business process completion operations by directly referencing a control interface component, independent of a screen layout of a control interface of an interface screen of the runtime of the business process application of which the control interface is a part.

21. The method of claim 20, further comprising the step of:

for each business process in a business process application configuration, adding to the test library an associated complex element for providing input data to the business process.

22. The method of claim 20, wherein the application wrapper functions generate events in a user interface associated with the application.

23. The method of claim 20, wherein the business process completion operation comprises invoking the wrapper functions to generate an Enter key press event in a user interface associated with the application.

24. The method of claim 20, wherein the business process completion operation comprises invoking the wrapper functions to generate an OK button press event in a user interface associated with the application.

25. The method of claim 20, wherein the business process completion operation comprises invoking the wrapper functions to generate a Cancel button press event in a user interface associated with the application.

26. The method of claim 20, wherein the data input elements provide input data for every business process in a predefined set of business processes.

27. The method of claim 20, further comprising the steps of:
    adding to the test library a business process test;
    adding to the business process test at least one complex element call for invoking an associated complex element to test a business process;
    adding to the business process test input data for the business process, wherein the input data is associated with the at least one complex element call; and
    adding to the business process test at least one control element call for invoking an associated control element to complete a defined portion of the business process.

\* \* \* \* \*